(12) United States Patent
Hamada

(10) Patent No.: US 11,148,304 B2
(45) Date of Patent: Oct. 19, 2021

(54) TORQUE RESTRICTION MECHANISM, DRIVE DEVICE, AND ROBOT DEVICE

(71) Applicant: Mitsubishi Electric Corporation, Tokyo (JP)

(72) Inventor: Akiko Hamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 381 days.

(21) Appl. No.: 16/318,956

(22) PCT Filed: Jul. 5, 2017

(86) PCT No.: PCT/JP2017/024677
§ 371 (c)(1),
(2) Date: Jan. 18, 2019

(87) PCT Pub. No.: WO2018/025563
PCT Pub. Date: Feb. 8, 2018

(65) Prior Publication Data
US 2019/0299429 A1  Oct. 3, 2019

(30) Foreign Application Priority Data
Aug. 2, 2016 (JP) .............................. JP2016-152064

(51) Int. Cl.
*F16D 43/20* (2006.01)
*B25J 19/06* (2006.01)
(Continued)

(52) U.S. Cl.
CPC ............. *B25J 19/06* (2013.01); *B25J 9/1633* (2013.01); *F16B 1/00* (2013.01); *F16D 1/00* (2013.01);
(Continued)

(58) Field of Classification Search
CPC .......... F16D 43/20; F16D 43/24; F16D 43/30; F16D 27/01; F16D 2011/006
See application file for complete search history.

(56) References Cited

U.S. PATENT DOCUMENTS 6,093,128 A * 7/2000 Seith ..................... B25B 21/00
                                              173/216
9,476,465 B2 * 10/2016 Hong ..................... F16D 41/063
(Continued)

FOREIGN PATENT DOCUMENTS

JP     S61-144991 U    9/1986
JP     H11-247880 A    9/1999
(Continued)

OTHER PUBLICATIONS

International Search Report of the International Searching Authority dated Aug. 15, 2017 for the corresponding international application No. PCT/JP2016/024677 (and English translation).

*Primary Examiner* — Huan Le
(74) *Attorney, Agent, or Firm* — Posz Law Group, PLC

(57) ABSTRACT

A torque restriction mechanism is provided by which torque cutoff and torque transmission can be reliably performed without being affected by a rotation state of the drive unit, and damage to a collision object can be reduced even with a simple configuration. The torque restriction mechanism includes a first clutch and a second clutch. The first clutch cuts off torque to a driven unit when reaction torque at a stationary portion of a motor equals or exceeds a first value. The second clutch that transmits torque in accordance with a rotation state of a rotor of the motor, cuts off torque to the driven unit when the reaction torque equals or exceeds a second value larger than the first value.

19 Claims, 19 Drawing Sheets

(51) Int. Cl.
    *B25J 9/16*          (2006.01)
    *H02K 7/11*         (2006.01)
    *F16B 1/00*         (2006.01)
    *F16D 1/00*         (2006.01)
    *F16D 43/24*       (2006.01)
    *F16D 43/30*       (2006.01)
    *F16D 27/01*       (2006.01)
    *F16D 11/00*       (2006.01)

(52) U.S. Cl.
    CPC ............. *F16D 27/01* (2013.01); *F16D 43/20* (2013.01); *F16D 43/24* (2013.01); *F16D 43/30* (2013.01); *H02K 7/11* (2013.01); *F16D 2011/006* (2013.01)

(56) References Cited

U.S. PATENT DOCUMENTS

2010/0163264 A1*   7/2010   Simm .................... B23B 45/008
                                                          173/178
2017/0326962 A1*  11/2017   Aringsmann ........... F16D 13/24

FOREIGN PATENT DOCUMENTS

| JP | 2000-240382 A | 9/2000 |
|----|---------------|--------|
| JP | 2005-134792 A | 5/2005 |
| JP | 2013-163223 A | 8/2013 |
| JP | 2013-163224 A | 8/2013 |

\* cited by examiner

TORQUE RESTRICTION MECHANISM, DRIVE DEVICE, AND ROBOT DEVICE

CROSS REFERENCE TO RELATED APPLICATIONS

This application is a U.S. national stage application of International Application No. PCT/JP2017/024677, filed on Jul. 5, 2017, and is based on Japanese Patent Application No. 2016-152064, filed on Aug. 2, 2016, the contents of which are incorporated herein by reference.

TECHNICAL FIELD

The present invention relates to a torque restriction mechanism, a drive device, and a robot device.

BACKGROUND

An industrial robot device that normally needs to be operated at high speed and high accuracy is typically unable to absorb and release an external force applied during a collision.

In a case where a robot device unexpectedly collides with a person, a machine, or the like, the robot device may damage the collision object such as the person or an object, or a driven part of the robot device. The collision object is an object that is struck by the robot device during operation. Examples of the collision object include a person, a part of the robot device, or another tangible object within the path of the robot device's movements.

In order to reduce such damage, the robot device is expected to have some mechanism (torque restriction mechanism) to absorb and release such external force applied in a collision.

As a conventional torque restriction mechanism, for example, a configuration is disclosed (for example, refer to Patent Document 1) in which a fixed value is adopted for a torque restriction value. The torque restriction value is the amount of force that holds together two components. The first and the second clutch each have a torque restriction value that defines how strongly the first and second clutch magnetically couple parts of the motor and the housing.

In such a configuration, a drive shaft and a driven shaft are coupled by the attractive force of a magnetic device to transmit torque from the drive shaft to the driven shaft.

In contrast, when a load exceeding the torque restriction value is applied, the attractive force that couples the drive shaft and the driven shaft is cancelled to allow the driven shaft to rotate freely.

As a configuration in which the torque restriction value is variably controlled by a controller, a technique for reducing damage to a person and an object in a collision is disclosed (for example, refer to Patent Document 2) in which, when a collision is detected, the friction force between the drive shaft and the driven shaft is changed in accordance with a command from the controller to decrease the restriction value of the torque being transmitted.

The torque restriction mechanism described in Patent Document 1 (Japanese Unexamined Utility Model Application Publication No. S61-144991) cuts off or transmits torque using the torque restriction value determined by the attractive force of the magnetic device.

Note that, the torque restriction value is a value predetermined in accordance with the attractive force of the device and thus cannot be changed during rotating operation.

As a result, a problem arises in that, depending on the rotation state of the drive unit, the torque cannot be appropriately transmitted or cut off.

To be more specific, in order to cut off the torque at the time of a collision, in the stationary portion of a motor, the reaction torque that is the sum of drive reaction torque changing in accordance with angular acceleration of the drive unit and external force reaction torque generated in a collision with the collision object needs to exceed the torque restriction value.

When the angular acceleration value of the drive unit is small, the sum of the reaction torque may not exceed the torque restriction value unless large external force reaction torque is applied s (i.e., unless a large force is applied to, or from, the collision object).

Thus, there is a problem in that the torque cutoff is not appropriately performed even in a normal collision.

In contrast, there is another problem that, when the angular acceleration value of the drive unit becomes large, the drive reaction torque alone generated by the drive unit may exceed the torque restriction value, and thus the torque is cut off even when collision has occurred.

In the torque restriction mechanism described in Patent Document 2 (Japanese Laid-Open Patent Publication No. 2013-163224), the torque restriction value is set to be variable by a controller, so that the damage to a collision object at the time of a collision can be reduced. In order to achieve such a configuration, however, a problem arises in that a complicated configuration is required.

SUMMARY

The present invention is made in consideration of the above described problems, and provides a torque restriction mechanism that can reliably perform torque cutoff or torque transmission without being affected by a rotation state of the drive unit and reduce damage to a collision object even in a simple configuration.

A torque restriction mechanism according to the present invention is connected to a housing and a stationary portion that includes a stator of a motor for rotating a driven unit with respect to the housing of a drive device for housing the motor, and also transmits or cuts off torque from the housing to the stationary portion. The torque restriction mechanism includes a first clutch to cut off the torque to the driven unit when reaction torque generated in the stationary portion due to rotation of the driven unit equals or exceeds a predetermined first value, and a second clutch to transmit the torque based on a rotation state of a rotor of the motor to be connected to the driven unit. The second clutch cuts off the torque to the driven unit when the reaction torque equals or exceeds a second value larger than the first value.

A torque restriction mechanism according to the present invention can reliably perform torque cutoff and transmission without being affected by a rotation state of the drive unit, and reduce damage to a collision object in a simple configuration.

DETAILED DESCRIPTION

Embodiment 1

Figure 1:
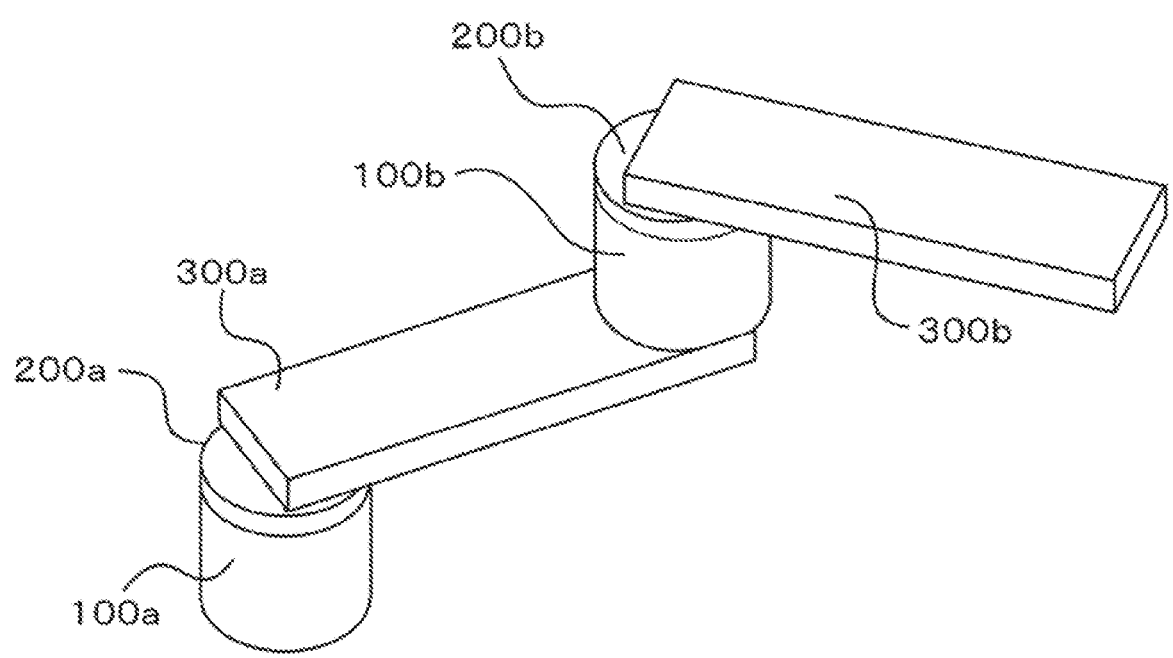
FIG. 1 is a schematic diagram of a robot device using a torque restriction mechanism according to the present embodiment.

FIG. 1 is a schematic diagram of a robot device using a torque restriction mechanism according to the present embodiment. The robot device according to the present embodiment includes drive devices 100a and 100b and link mechanisms 300a and 300b. The drive device 100a includes a motor and a torque restriction mechanism 200a. Similarly, the drive device 100b includes a motor and a torque restriction mechanism 200b. Further, the link mechanism 300a being a driven unit is connected to a drive rotation shaft of a rotor of the motor of the drive device 100a, and is rotated by the rotation of the rotor with respect to a housing of the drive device 100a fixed to a base. Similarly, the link mechanism 300b being a driven unit is connected to the drive rotation shaft of the rotor of the motor of the drive device 100b, and is rotated by the rotation of the rotor with respect to the housing of the drive device 100b fixed to the link mechanism 300a. The torque restriction mechanisms 200a and 200b are devices to perform transmission or cutoff of the rotation of the rotor with respect to the link mechanisms 300a and 300b, respectively.

The motors are each housed inside the drive devices 100a and 100b. The torque restriction mechanism 200a provided in the drive device 100a performs torque transmission or torque cutoff from the motor housed in the drive device 100a to the link mechanism 300a. Similarly, the torque restriction mechanism 200b provided in the drive device 100b performs torque transmission or torque cutoff from the motor housed in the drive device 100b to the link mechanism 300b.

A first end of the link mechanism 300a is fixed to the rotor of the motor housed in the drive device 100a, and a second end of the link mechanism 300a is fixed to the housing of the drive device 100b. A first end of the link mechanism 300b is fixed to the rotor of the motor housed in the drive device 100b. When the rotor of the motor housed in the drive device 100a rotates, the link mechanism 300a rotates. Then, the drive device 100b fixed to the second end of the link mechanism 300a rotates together. In the following, the drive devices 100a and 100b, the torque restriction mechanisms 200a and 200b, and the link mechanisms 300a and 300b are collectively referred to as drive devices 100, torque restriction mechanisms 200, and link mechanisms 300, respectively.

In the following, for convenience of explanation, a configuration in which a single drive device 100 and a single link mechanism 300 are provided will be described. Note that, the difference between the case where a plurality of the drive devices 100 and a plurality of the link mechanisms 300 are provided and the case where a single drive device 100 and a single link mechanism 300 are provided will be described later.

The rotation shaft of the motor housed in the drive device 100 is fixed to the link mechanism 300. Thus, when the rotor of the motor of the drive device 100 rotates, the link mechanism 300 also rotates. Then, due to the torque acting on the rotating link mechanism 300, drive reaction torque is applied to a stationary portion of the motor and to the housing of the drive device 100 that fixes the stationary portion. That is, the drive reaction torque, which is generated by the torque acting on the rotor of the motor 1 and the link mechanism 300 connected to the rotor, is proportional mainly to angular acceleration of the drive rotation shaft in the rotor of the motor 1. Note that, the drive reaction torque and external force reaction torque are each defined as follows for description. The drive reaction torque is a reaction torque generated in the stationary portion of the motor 1 when the rotor of the motor 1 rotates the link mechanism 300. The external force reaction torque is a reaction torque generated in the stationary portion of the motor 1 when force due to a collision etc. is externally applied to the link mechanism 300. Note here that, when a torque is simply referred to as the reaction torque, it means the sum of the drive reaction torque and the external force reaction torque.

Figure 2:
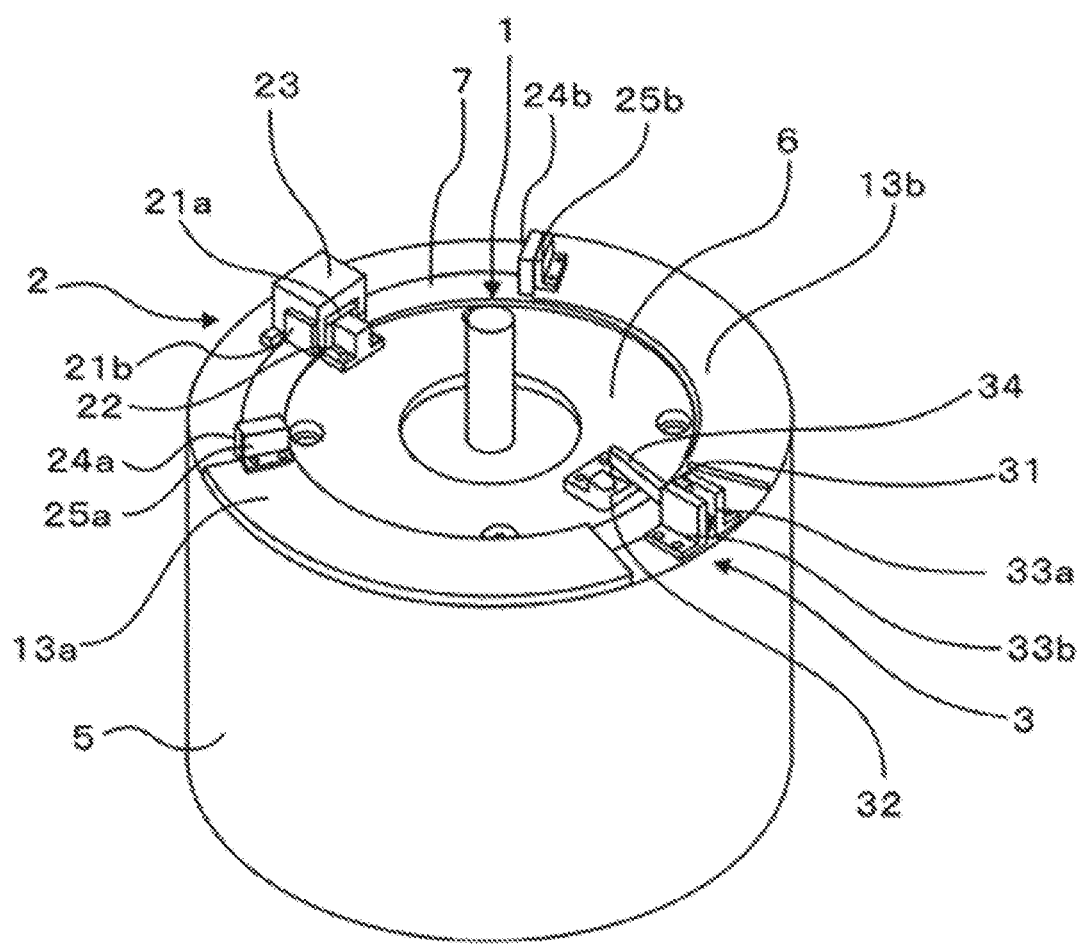
FIG. 2 is a perspective view to illustrate the torque restriction mechanism according to Embodiment 1.
Figure 3:
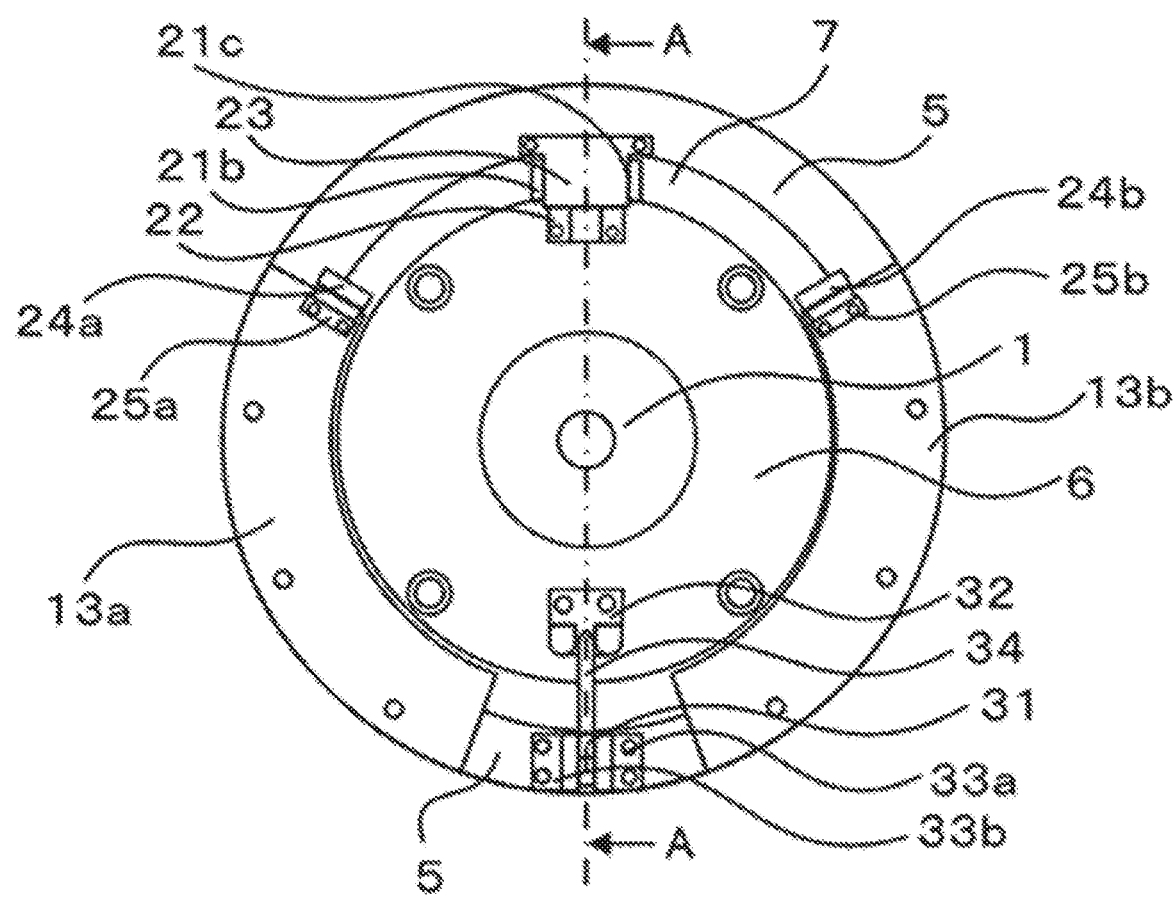
FIG. 3 is a top view to illustrate the torque restriction mechanism according to Embodiment 1.

FIG. 2 is a perspective view to illustrate the torque restriction mechanism according to Embodiment 1 of the present invention. FIG. 3 is a top view to illustrate the torque restriction mechanism according to Embodiment 1. In the following, the terms, "radial direction" and "circumferential direction" refer to the radial direction and the circumferential direction of the motor 1, respectively.

In addition to the torque restriction mechanism 200, the drive device 100 includes the motor 1, the housing 5 to contain the motor 1, and a motor fixing plate 6 being a member to which the motor 1 is fixed inside the housing 5.

The motor fixing plate 6 is, for example, a circular plate, and is supported by a sliding member 7, so as to be freely rotatable in the circumferential direction with respect to the housing 5. The sliding member 7 will be described later in detail referring to FIG. 4. Further, on the upper end of the housing 5, housing covers 13a and 13b that are formed to overhang inward in the radial direction are provided.

The motor 1 includes the rotor to rotate the link mechanism 300 and the stationary portion to house the rotor to be rotatable. The motor 1 is provided with a brake not shown in figures. When current supply to the motor 1 is stopped, by the brake, the motion of the rotor of the motor 1 is stopped. In the configuration of the present embodiment, the stationary portion of the motor 1 is fixed inside the housing 5. The motor 1, however, may be fixed elsewhere other than the inside of the housing 5.

The torque restriction mechanism 200 of the drive device 100 includes a first clutch 2 to operate constantly as a clutch and a second clutch 3 to be driven under a predetermined condition. To be specific, the first clutch 2 is a clutch to fix the motor 1 to the housing 5 in such a way that the torque restriction value equals a first value. The second clutch 3 is driven or halted in accordance with rotation angle information of the rotor of the motor 1. When the second clutch 3 is driven, the torque restriction value is raised to a second value larger than the first value.

The terms "transmission" and "cutoff" of a torque in the description respectively refers to "torque transmission" and "torque cutoff" from the housing of the drive device 100 to the stationary portion of the motor 1, performed by the torque restriction mechanism 200, and respectively means "transmitting of rotation force" and "not-transmitting of rotation force" from the rotor of the motor 1 to the link mechanism 300. The torque restriction mechanism 200 changes the number of clutches driven in accordance with the angular acceleration.

When the second clutch 3 is "driven," it means that the second clutch 3 is "in a state in which it is involved in the torque transmission and the torque cutoff." In contrast, when the second clutch 3 is "halted", it means that the second clutch 3 is "in a state in which it is not involved in the torque transmission and the torque cutoff." When the second clutch 3 is halted, only the first clutch 2 is involved in the torque transmission or the torque cutoff, and thus the torque restriction value equals the first value. When the second clutch 3 is driven, both the first clutch 2 and the second clutch 3 are involved in the torque transmission and the torque cutoff, and thus the torque restriction value equals the second value that is larger than the first value.

The first clutch 2 includes a magnet member including permanent magnets 21a, 21b, and 21c, a magnet support 22 fixed to the motor fixing plate 6, a magnet holder 23 fixed to the housing 5, stoppers 24a and 24b, and stopper supports 25a and 25b. The first clutch 2 further includes a torque cutoff detection sensor to be described later using FIG. 7.

The stoppers 24a and 24b are disposed on opposite sides of the first clutch 2 in the circumferential direction of the motor 1. The stopper 24a is fixed to the housing cover 13a by the stopper support 25a. Similarly, the stopper 24b is fixed to the housing cover 13b by the stopper support 25b. In the following description, the stoppers 24a and 24b are collectively referred to as a stopper 24. Similarly, the stopper supports 25a and 25b are collectively referred to as a stopper support 25.

The stopper 24 is a shock absorbing member made of a material such as resin to reduce impact at the time of a collision. The stopper 24 is fixed to the housing cover 13 via the stopper support 25. When the torque restriction mechanism 200 cuts off torque transmission from the motor 1 to the link mechanism 300 (i.e, when the movement restriction of the motor 1 in the circumferential direction is removed) the stopper 24 collides with the rotating magnet support 22, and the impact in the collision is absorbed by the stopper 24.

The second clutch 3 includes a solenoid 31 (clutch driver), a concave block 32 (clutch locking part) fixed to the motor fixing plate 6, plate spring holders 33a and 33b fixed to the housing 5 with screws, and a plate spring 34 (clutch driven part). Note that, in the second clutch 3 according to the present embodiment, the solenoid 31 cases the plate spring 34 to move to be locked in the concave block 32. The solenoid 31 is driven when a predetermined condition is satisfied, and its detail will be described later. In the way described above, the second clutch 3 is driven.

Note that, in the following, the plate spring holders 33a and 33b are collectively referred to as a plate spring holder 33.

A first end of the plate spring 34 is fixed to the housing 5 of the drive device 100. When the angular acceleration equals or exceeds a predetermined value, the solenoid 31 causes a second end of the plate spring 34 to move at the inner side in the radial direction of the motor 1, so that the second end is locked in the concave block 32. In this way, the plate spring 34 is locked in the concave block 32, and thereby the stationary portion of the motor 1 is fixed to the housing 5 via the motor fixing plate 6.

When the rotor of the motor 1 rotates, the drive reaction torque applies to the stationary portion of the motor 1 and the motor fixing plate 6 to which the stationary portion is fixed. The first clutch 2 and the second clutch 3 restrict movement of the stationary portion of the motor 1 and the motor fixing plate 6 in the circumferential direction. As will be described in detail later, when the reaction torque exceeding the torque restriction value is applied to the stationary portion of the motor 1, the motor 1 together with the motor fixing plate 6 is allowed to move in the circumferential direction.

Figure 4:
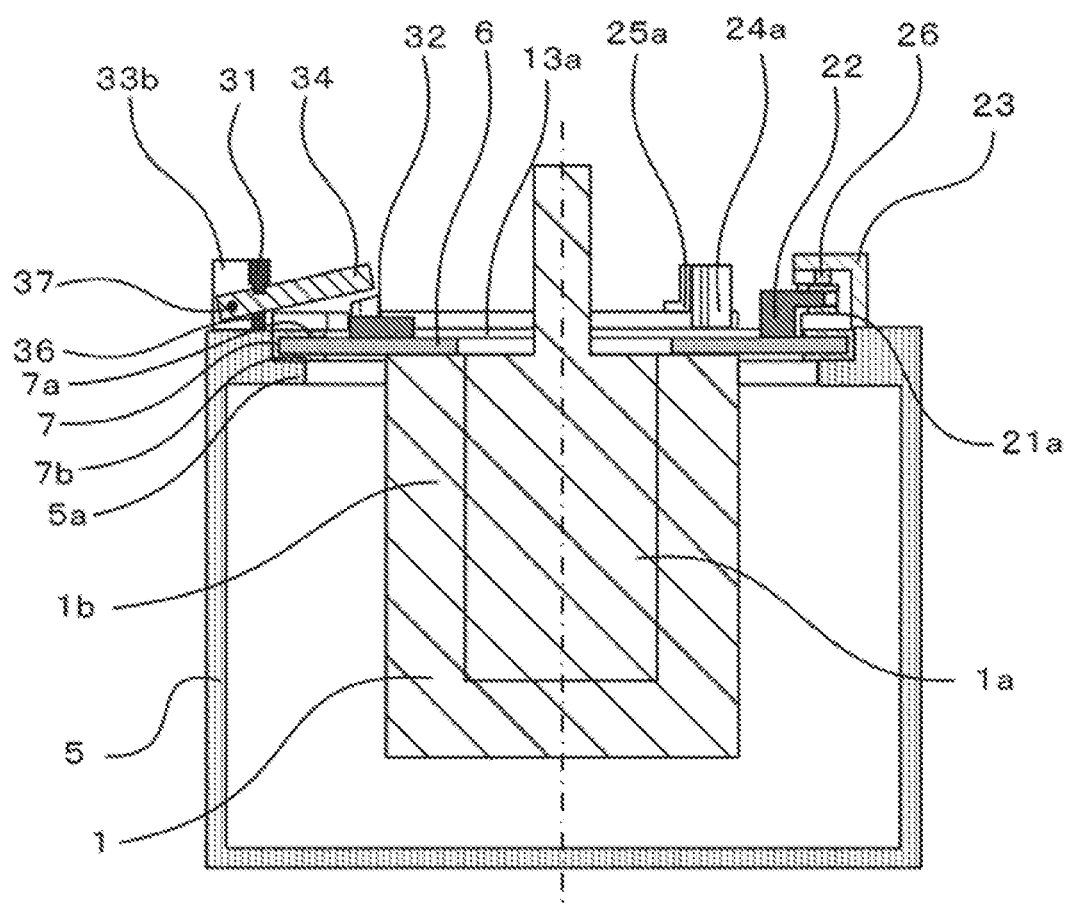
FIG. 4 is a cross-sectional diagram taken along the line A-A shown in FIG. 3 to illustrate the torque restriction mechanism according to Embodiment 1.

FIG. 4 is a cross-sectional view taken along the line A-A shown in FIG. 3 to illustrate the torque restriction mechanism according to Embodiment 1.

Using FIG. 4, the internal structure of the drive device 100 will be described in detail. A housing 5 has a flange 5a formed in its inner circumference. The motor fixing plate 6 is placed on the flange 5a and a stationary portion 1b of the motor 1 is fixed to the bottom of the motor fixing plate 6. The stationary portion 1b includes a stator of the motor 1. As described above, a rotor 1a of the motor 1 is disposed inside the stator of the stationary portion 1b and housed by the stator of the stationary portion 1b to be rotatable.

The motor fixing plate 6 is placed over the flange 5a formed to the housing 5 as shown in FIG. 4. A portion of the motor fixing plate 6 where the plate is supported by the flange 5a of the housing 5 is peripherally covered with the sliding member 7. Thus, when torque transmission is cut off by the torque restriction mechanism 200 (i.e., when neither the first clutch 2 nor the second clutch 3 fixes the motor fixing plate 6) the motor 1 and the motor fixing plate 6 become rotatable in the housing 5 via the sliding member 7. In this case, even when the link mechanism 300 is rotated by the rotor of the motor 1, the stationary portion of the motor 1 is also rotated owing to the drive reaction torque, and thus, the torque transmission from the rotor of the motor 1 to the link mechanism 300 cannot be performed. In contrast, when the torque transmission is performed by the torque restriction mechanism 200, in other words, when only the first clutch 2 or both of the first clutch 2 and the second clutch 3 fix the stationary portion of the motor 1 to the housing 5 via the motor fixing plate 6, then the drive reaction torque applied to the stationary portion of the motor 1 is transmitted to the housing 5 via the motor fixing plate 6. Then, the stationary portion of the motor 1 is fixed by the housing 5, and the housing 5 cannot be moved by the drive reaction torque. Thus, the rotor of the motor 1 can transmit the torque to the link mechanism 300. The motor fixing plate 6 is fixed to the housing 5 via the torque restriction mechanism 200 and the housing cover 13 fixed to the housing 5. Thus, the stationary portion of the motor 1 fixed to the motor fixing plate 6 cannot be moved in the circumferential direction.

The sliding member 7 formed in a U shape in its cross section has an upper face portion 7a facing down to the upper face of the motor fixing plate 6 and a lower face portion 7b facing up to the bottom face of the motor fixing plate 6. Further, the sliding member 7 is also disposed in a place that is interposed between the housing 5 and the motor fixing plate 6 in the radial direction.

Figure 5A:
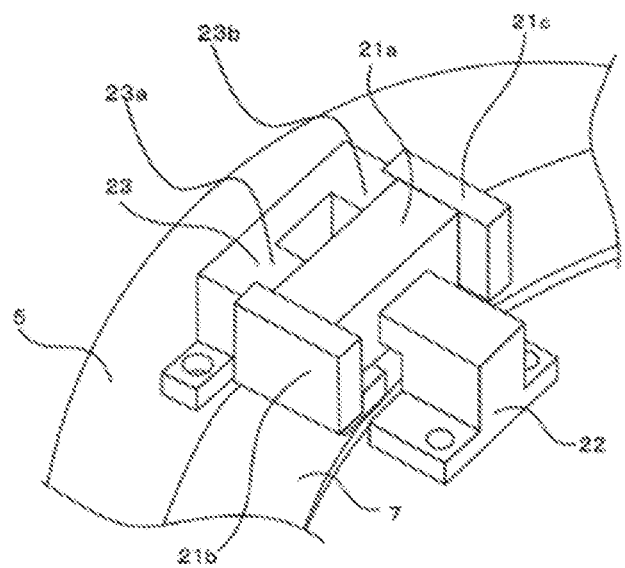
FIG. 5A is an illustrative diagram showing a more detailed structure of a first clutch of the torque restriction mechanism according to Embodiment 1.
Figure 5B:
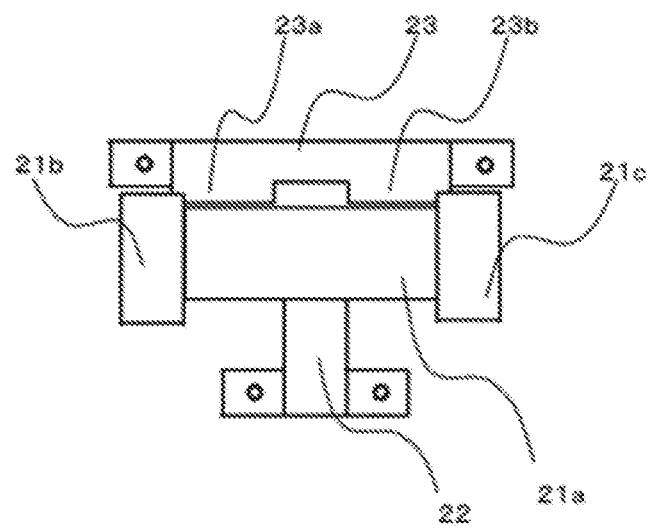
FIG. 5B is a top view of a configuration of the first clutch shown in FIG. 5A.

Using FIG. 4 and FIG. 5A and FIG. 5B, a structure of the first clutch 2 will be described. FIG. 5A and FIG. 5B is an illustrative diagram showing the first clutch 2 of the torque restriction mechanism according to Embodiment 1 in more detail. FIG. 5A is a perspective view of an internal structure of the first clutch 2 in which a part of the magnet holder 23 covering the permanent magnet 21a is removed. FIG. 5 B is a top view of a configuration of the first clutch 2 shown in FIG. 5A. The magnet member will be described in more detail. The magnet support 22 includes a base fixed to the stationary portion of the motor 1 and a protruding portion extending from the base outward in the radial direction of the motor 1. The permanent magnet 21a is fixed to this protruding portion of the magnet support 22. Thus, when the magnet support 22 moves, the permanent magnet 21a rotates in the circumferential direction. Further, the magnet holder 23 is fixed to the housing 5 of the motor 1.

In addition, the permanent magnets 21b and 21c are disposed on one side and the other side of the permanent magnet 21a in the circumferential direction, respectively.

In the case where the first clutch 2 is transmitting torque, the magnet holder 23 is disposed, as shown in FIG. 5 B, on the outer face side of the permanent magnet 21a in the radial direction. The permanent magnets 21b and 21c are disposed on one side and the other side of the permanent magnet 21a in the circumferential direction, respectively. Thus, the permanent magnets 21a and 21b as well as the permanent magnets 21a and 21c attract each other because of their magnetic force.

The magnet holder 23 has convex portions 23a and 23b formed to protrude inward in the radial direction. The magnet holder 23 restricts movement of the permanent magnet 21b from its position at the convex portion 23a in the circumferential direction toward the magnet holder 23, namely, in the clockwise direction. Similarly, the magnet holder 23 restricts movement of the permanent magnet 21c from its position at the convex portion 23b in the circumferential direction toward the magnet holder 23, namely, in the counterclockwise direction.

Thus, in the case when, owing to the reaction torque, force smaller than the attractive force between the permanent magnets 21a and 21c is applied to the permanent magnet 21a in the circumferential and counterclockwise direction, the magnet support 22 and the permanent magnet 21a do not move in the circumferential direction. In the case when the reaction torque is applied in the clockwise direction, the explanation is not repeated because of the similarity.

In contrast, in the case when, owing to the reaction torque, force larger than the attractive force between the permanent magnets 21a and 21c is applied to the first clutch 2, the permanent magnet 21c and the permanent magnet 21a become separated in the circumferential direction. Thus, the permanent magnet 21a, together with the magnet support 22, rotates in the counterclockwise direction.

Further, a more detailed structure of the second clutch 3 will be described below. The concave block 32 is fixed to the motor fixing plate 6. In contrast, the plate spring holder 33 is fixed to the housing cover 13. In addition, the plate spring holder 33 supports the plate spring 34 to be freely rotatable around a plate spring pin 37 serving as a rotation shaft.

The plate spring 34 is sandwiched between the solenoid 31 and a coil spring 36 in the vertical direction. The solenoid 31 and the coil spring 36 are disposed on the same axis. The solenoid 31 is fixed to the plate spring holder 33 and the coil spring 36 is fixed to the housing 5. The solenoid 31 is controlled by the controller 4. When energized, the solenoid 31 gives a downward force to the coil spring 36. When the plate spring 34, together with the coil spring 36, is pressed owing to downward force by the solenoid 31, the second end of the plate spring 34 is locked in a groove of the concave block 32. In this way, with the locking of the concave block 32 and the plate spring 34, the second clutch 3 restricts movement of the stationary portion of the motor 1 in the circumferential direction. In addition, when the solenoid 31 is not energized, the coil spring 36 causes, by its resilience, the second end of the plate spring 34 to return to its original position at which the plate spring 34 is not locked in the concave block 32.

Figure 6:
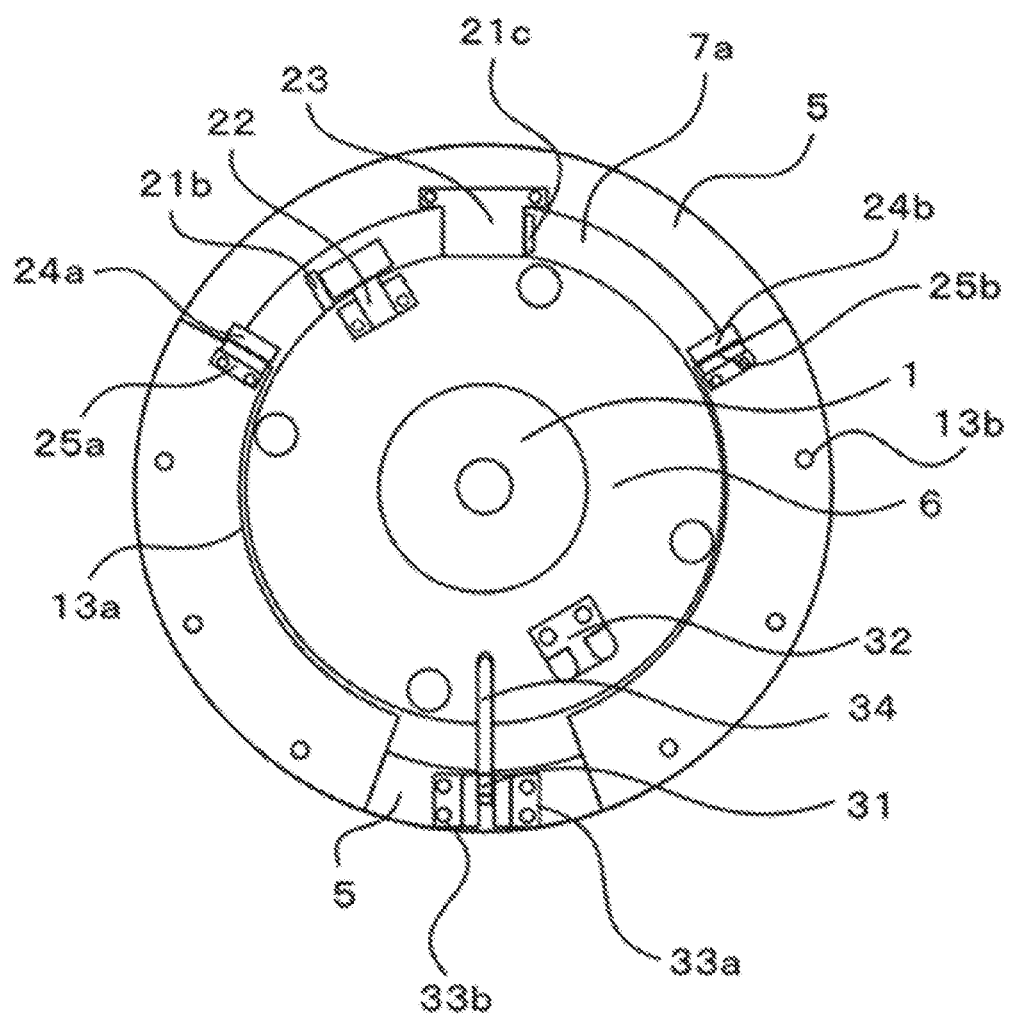
FIG. 6 is a top view showing a state in which a motor fixing plate and the motor are circumferentially rotated owing to the torque cutoff by the torque restriction mechanism according to Embodiment 1.

FIG. 6 is a top view showing a state in which the torque restriction mechanism 200 cuts off torque transmission from the motor 1 to the link mechanism 300 by making the motor fixing plate 6 and the stationary portion of the motor 1 rotate in the circumferential direction. When the first clutch 2 cuts off the torque, the magnet support 22 moves in the circumferential direction, as shown in the figure.

Figure 7:
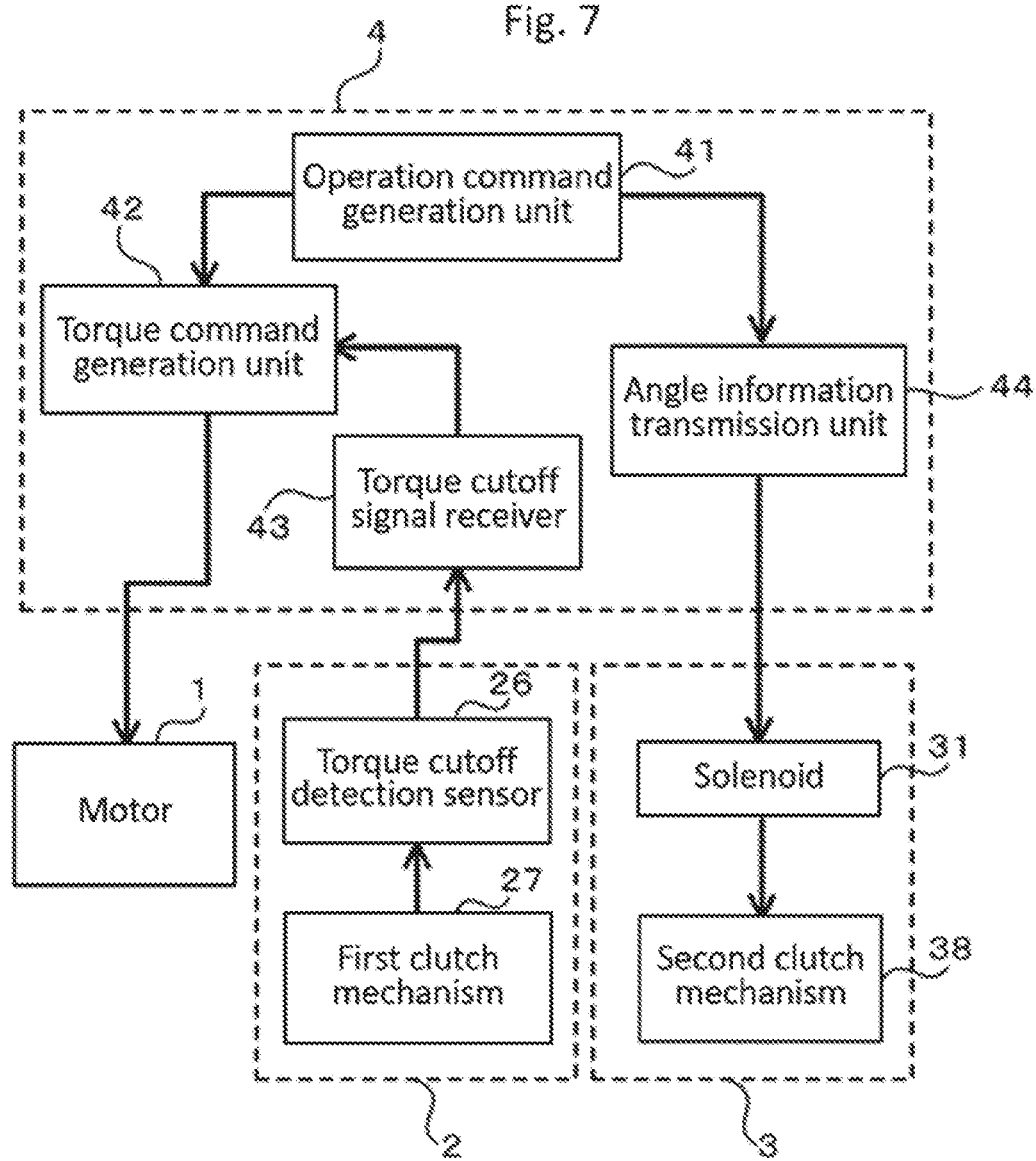
FIG. 7 is a block diagram showing a configuration of the torque restriction mechanism according to Embodiment 1.

FIG. 7 is a block diagram to illustrate operations of the controller 4 according to the present embodiment. The controller 4 includes an operation command generation unit 41 to control the motor 1, a torque command generation unit 42, a torque cutoff signal receiver 43 to receive a torque cutoff signal from the first clutch 2, and an angle information transmission unit 44 to transmit angular acceleration information from the operation command generation unit 41 to the second clutch 3.

For simplifying the description in FIG. 7, it is assumed that the first clutch 2 is configured with the torque cutoff detection sensor 26 and a first clutch mechanism 27 and the second clutch 3 is configured with the solenoid 31 and a second clutch mechanism 38.

As mentioned above, a first clutch mechanism 27 includes the magnet member, the magnet support 22, the magnet holder 23, the stopper 24, and stopper support 25. A second clutch mechanism 38 corresponds to the configuration without the solenoid 31 (clutch driver) among the configuration of the second clutch. In the controller 4 shown in FIG. 7, the arrow from the first clutch mechanism 27 to the torque cutoff detection sensor 26 and the arrow from the solenoid 31 to the second clutch mechanism 38 indicate physical connections, while the other arrows indicate electric connections.

The operation command generation unit 41 generates a control signal for controlling the motor 1. The torque command generation unit 42 generates a current waveform corresponding to the control signal, and using this current waveform, current is supplied to the motor 1. By the supplied current, the motor 1 is driven to perform operations designated by the operation command generation unit 41.

As mentioned above, the first clutch mechanism 27 uses the attractive force of the permanent magnets. When the torque restriction mechanism 200 cuts off torque transmission, in other words, when the stationary portion of the motor 1 becomes freely rotatable in the circumferential direction, the torque cutoff detection sensor 26 of the first clutch 2 outputs a torque cutoff detection signal to the torque cutoff signal receiver 43 of the controller 4. The torque cutoff signal receiver 43 outputs the torque cutoff detection signal to the torque command generation unit 42. Upon receiving the torque cutoff detection signal, the torque command generation unit 42 stops current supply to the motor 1. Thus, the motor 1 emergently stops.

The control signal outputted from the operation command generation unit 41 is also inputted to the angle information transmission unit 44. The angle information transmission unit 44 calculates, on the basis of the control signal, angular acceleration corresponding to the operation instructed to the motor 1 by the operation command generation unit 41. The calculated angular acceleration is transmitted from the angle information transmission unit 44 to the second clutch 3.

When the inputted angular acceleration value equals or exceeds a fixed value, the second clutch 3 supplies current from a power supply unit (not shown) to the solenoid 31. Thus, the solenoid 31 becomes energized and the second end of the plate spring 34 is locked in the concave block 32, so that the second clutch 3 is driven as a clutch.

In the following description, "operating state" of the solenoid 31 refers to a state where the plate spring 34 is moved by the solenoid 31, and thereby the plate spring 34 is locked in the concave block 32. Further, "non-operating state" other than the operating state refers to a state where the plate spring 34 is not locked in the concave block 32.

Figure 8:
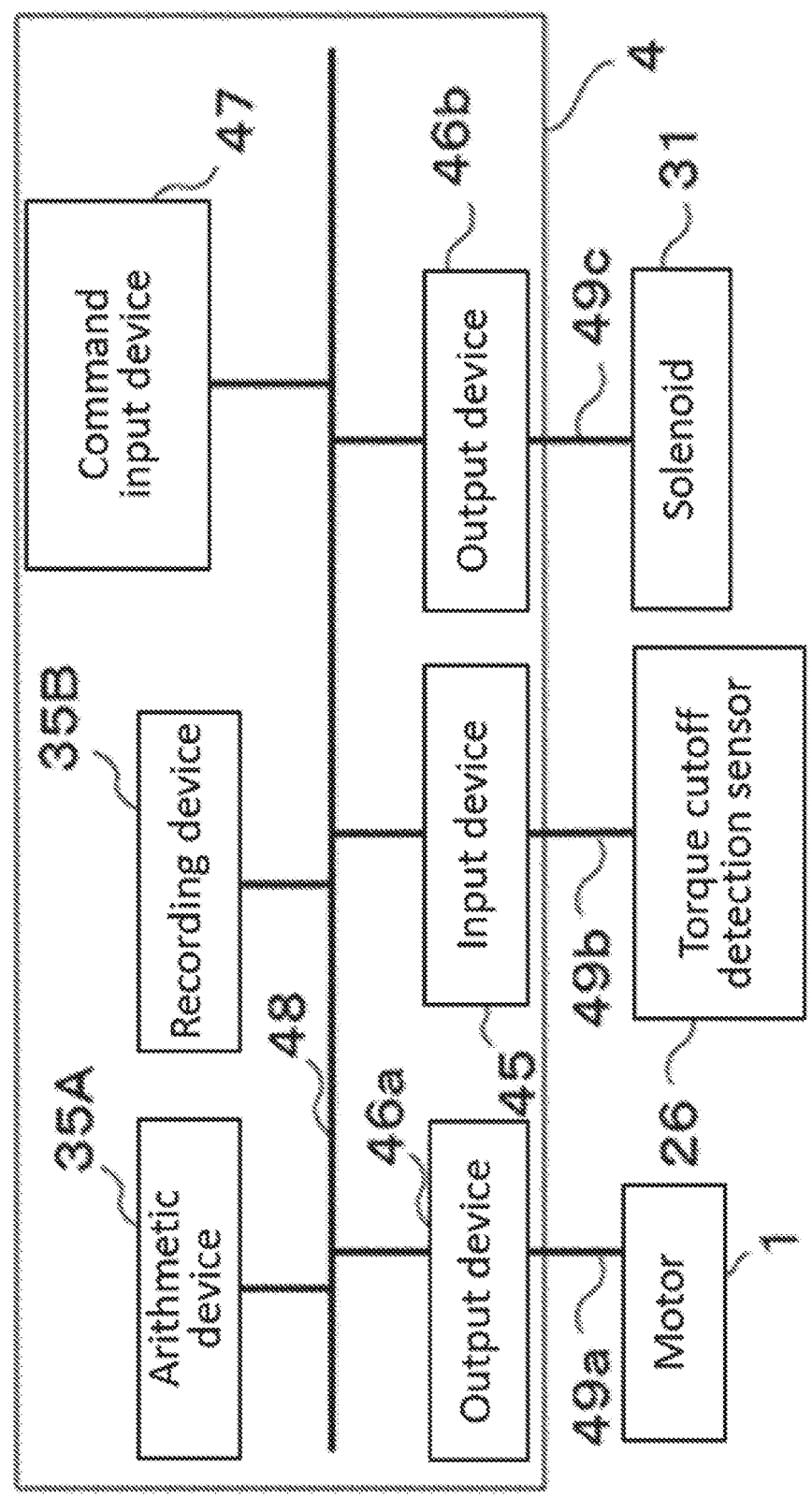
FIG. 8 is a hardware configuration diagram of the torque restriction mechanism according to Embodiment 1.

FIG. 8 is a hardware configuration diagram of the controller 4 in the torque restriction mechanism 200 according to the present embodiment. The controller 4 includes an arithmetic device 35A, a recording device 35B, an input device 45, a command input device 47, and output devices 46a and 46b. These components in the configuration are connected to each other via a bus 48. The controller 4 is connected to the motor 1, the torque cutoff detection sensor 26, and the solenoid 31 via a cable 49a, a cable 49b, and a cable 49c, respectively.

Note that, in the figure, the configuration is shown in which the input device 45, the command input device 47, the output devices 46a and 46b are provided, however, the number of the input devices and the output devices is not limited to the above-described example. Also, the input device and the output device each are shown as a separate component in the figure, they may implemented to be the same component.

First, a command is inputted by an operator to the command input device 47, and thereby a command for an operation of the robot device is inputted to the controller 4. Here, the command for an operation of the robot device indicates a hand position and speed, an operation order, etc. It is assumed that the command from an operator is directly inputted via a teaching device. Instead, a command may be generated by executing a program prepared in advance. The recording device 35B stores hardware information of the robot device, a calculation method from an operation command to a torque command, and the like. The arithmetic device 35A generates the control signal for the operation command to the motor 1 by converting the command from the operator based on the information stored in the recording device 35B. The arithmetic device 35A generates a current waveform corresponding to the torque command of the control signal. Here, the processing of the operation command generation unit 41 and the torque command generation unit 42 shown in FIG. 7 is implemented by the arithmetic device 35A. To be more specific, the arithmetic device 35A is realized, for example, by CPU (Central Processing Unit), and the recording device 35B is realized by a storage device such as HDD (Hard Disk Drive) and RAM (Random Access Memory).

A calculation result of the arithmetic device 35A is outputted from the two output devices 46a and 46b. The output device 46a outputs the command to the motor 1 via the cable 49a. When the angular acceleration of the motor 1 exceeds a predetermined value, the output device 46b outputs a current signal from the angle information transmission unit 44 via the cable 49c. Thus, the solenoid 31 is driven, so that the second clutch 3 is brought into the operating state.

When the torque cutoff detection sensor 26 receives the torque cutoff signal from the first clutch 2 because of a collision, etc., the torque cutoff signal is inputted to the input device 45 that constitutes the torque cutoff signal receiver 43. When the torque cutoff signal is inputted, the input device 45 transmits a signal to the torque command generation unit 42, and thus supply of a current signal is stopped. When the torque command generation unit 42 stops supplying the current signal, the motor 1 emergently stops.

In the present embodiment, the motor 1 is described as a component separated from the first clutch 2 and the second clutch 3. Instead, the motor 1 may be integrated into a component with the first clutch 2 and the second clutch 3.

Further, in the present embodiment, the torque is cut off by removing the movement restriction of the stationary portion in the motor 1 in the circumferential direction. Instead, the torque restriction mechanism may be disposed in which a torque restriction function is provided between the rotor of the motor 1 and the link mechanism 300 fixed to the rotor.

Figure 9:
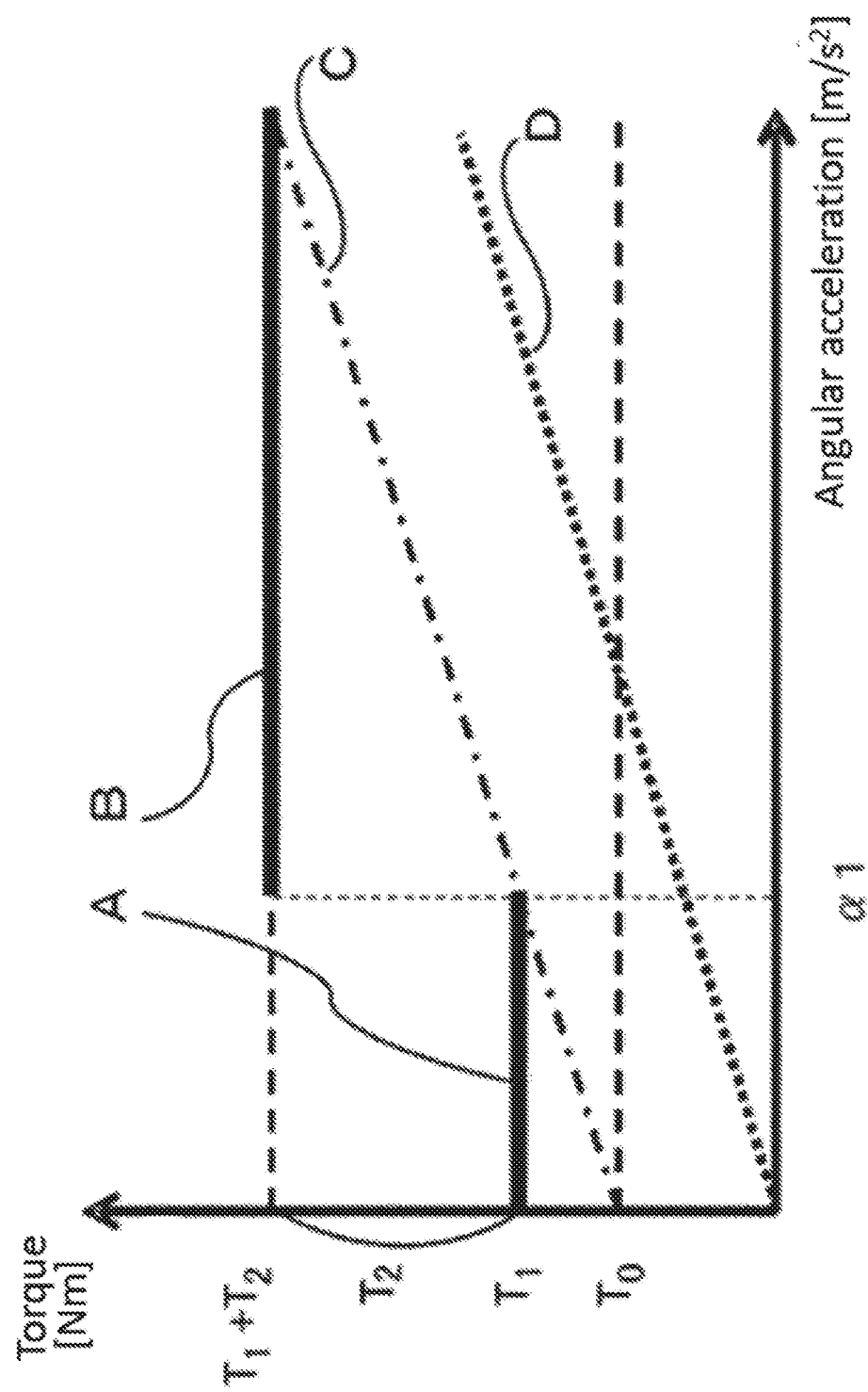
FIG. 9 is an illustrative diagram for torque restriction values of the torque restriction mechanism according to Embodiment 1.

Next, a torque restriction value in accordance with the rotation state of the motor 1 will be described using FIG. 9. FIG. 9 is a graph showing a relationship between angular acceleration of the rotor of the motor 1 and the torque restriction value. In the figure, the vertical axis represents torque and the horizontal axis represents the angular acceleration of the motor 1. The solid line A indicates that the torque restriction value is T1 (first value) [Nm: Newton meter], and the solid line B indicates that the torque restriction value is T1+T2 (second value) [Nm]. The dashed-dotted line C indicates ideal torque restriction values, and the dotted line D indicates the drive reaction torque generated caused by the rotation of the motor 1. Assuming that the influence of friction or the like at each joint is small, the drive reaction torque generated by the rotation of the rotor of the motor 1 is proportional to the angular acceleration of the rotor of the motor 1, as shown by the dotted line D in the figure.

When the current is not supplied and motor 1 is stopped, that is, when the angular acceleration of the rotor of the motor 1 is zero, the drive reaction torque is zero. Then, when the external force reaction torque with respect to the motor 1 equals or exceeds the torque restriction value T1 [Nm], the stationary portion of the motor 1 becomes freely rotatable in the circumferential direction. When the rotor of the motor 1 starts rotating, the angle information transmission unit 44 outputs the angular acceleration of the rotor of the motor 1 to the second clutch 3. When the angular acceleration value outputted from the angle information transmission unit 44 to the second clutch 3 is lower than a1, the second clutch 3 is not driven. In this way, when the reaction torque being the sum of the drive reaction torque and the external force reaction torque generated by the external force becomes equal to or exceeds the torque restriction value T1 [Nm], the stationary portion of the motor 1 becomes freely rotatable in the circumferential direction. And then, when the angular acceleration of the rotor of the motor 1 increases and the angular acceleration value outputted from the angle information transmission unit 44 to the second clutch 3 becomes equal to or exceeds a1, the second clutch 3 is driven, and then the torque restriction value becomes T1+T2 [Nm]. In this case, when the external force, etc. is applied and thus the reaction torque exceeding the torque restriction value is generated, the stationary portion of the motor 1 becomes freely rotatable in the circumferential direction.

In FIG. 9, T0 [Nm] is a torque restriction value for ensuring safety such that, if the robot device collides with an object, the robot device does not damage the collision object. When the second clutch 3 is not driven, T1 [Nm] is the torque restriction value. Further, T2 [Nm] is a torque value at which the second clutch 3 removes the movement restriction in the circumferential direction when the torque applied to the second clutch 3 becomes equal to or exceeds this value. When both the first clutch 2 and the second clutch 3 are driven, the reaction torque of T1+T2 [Nm] is being applied, so that the torque restriction mechanism allows the stationary portion of the motor 1 to rotate freely in the circumferential direction. That is, in the present embodiment 1, the torque restriction values in the torque restriction mechanism are set to two stages: T1 (the first value) [Nm] and T1+T2 (the second value) [Nm].

In the torque restriction mechanism according to the present embodiment, the first clutch is mechanically configured and constantly in operation without controlled by the controller, and thus influence from the controller can be prevented. Both clutches (the first clutch 2 and the second clutch 3) can mechanically restrict rotation of the stationary portion of the motor 1 in the circumferential direction by using the attractive force between the permanent magnets as well as the locking force between the plate spring and the concave block, even though the second clutch 3 is affected by runaway of the controller. That is, both clutches are mechanically configured. Thus, the torque restriction value in the torque restriction mechanism does not exceed its design value, i.e., T1+T2. Therefore, a torque restriction mechanism that ensures the safety can be achieved in a simple configuration. In addition, because of the presence of the second clutch 3, when the angular acceleration increases and the external force is not applied, the torque restriction mechanism does not cut off the torque owing to the drive reaction torque.

When the external force is applied from outside which corresponds to the difference between the drive reaction torque applied to the stationary portion in accordance with the angular acceleration of the rotor of the motor 1 and the torque restriction value, the rotor of the motor 1 emergently stops. In other words, in FIG. 9, in the case where the torque restriction values indicated by the dashed-dotted line C are given, the motor 1 emergently stops when an external torque exceeding the difference in the values between the dashed-dotted line C and the dotted line D, that is, T0 is externally applied at an angular acceleration value of the rotor of the motor 1. Torque due to the external force is applied to the link mechanism 300 at the time of a collision. When the torque restriction value is exceeded, as shown in FIG. 6, the magnet support 22, the permanent magnets 21a and 21b rotate in the counterclockwise direction, for example.

Using FIG. 2 through FIG. 7, the operation of the first clutch 2 will be described. In the following, the case where, in FIG. 3, the first clutch 2 is subjected to the reaction torque counterclockwise will be described, for example. When the rotor of the motor 1 rotates, the stationary portion of the motor 1 is subjected to the drive reaction torque cause by the rotational motion of the link mechanism 300 connected to the motor 1.

When the rotor of the motor 1 starts rotating, for example, in the clockwise direction, force is applied in the opposite direction to which the permanent magnet 21c attracts the permanent magnet 21a. When the force equals or exceeds a predetermined value, that is, the value corresponding to the torque restriction value T1 [Nm], the permanent magnet 21a and the permanent magnet 21c become separated. As a result, as shown in FIG. 6, the magnet support 22, the permanent magnet 21a, and the permanent magnet 21b rotate in the counterclockwise direction. Note that, the rotation of the permanent magnet 21a is restricted to the range up to the collision with the stopper 24a.

Using FIG. 2 through FIG. 7, the operation of the second clutch 3 will be described. In the second clutch 3 shown in FIG. 4, when energized, the solenoid 31 downwardly pushes the upper portion of the plate spring 34. The coil spring 36 is compressed by the pushing force, and the second end of the plate spring 34 is locked in the concave block 32, and thus, the motor fixing plate 6 is prevented from rotating in the circumferential direction. In contrast, when reaction torque exceeding the second torque restriction value, that is, T1+T2 [Nm], is applied to the stationary portion of the motor 1, force applied to the plate spring 34 equals or exceeds the force corresponding to the torque restriction value T2.

Thus, the second end of the plate spring 34 deforms owing to the reaction force from the concave block 32, so that the plate spring 34 is detached from the groove of the concave block 32 in the circumferential direction. Then, as shown in FIG. 6, the motor fixing plate 6 rotates on the sliding member 7 in the circumferential direction.

In the present embodiment, when the first clutch 2 and the second clutch 3 are driven together, they contribute to the movement restriction in the circumferential direction. Thus, when reaction torque exceeding T1+T2 [Nm] is applied to the stationary portion of the motor 1 and the motor fixing plate 6, both clutches allow the motor fixing plate 6 to freely rotate in the circumferential direction. Then, the stationary portion of the motor 1 fixed to the motor fixing plate 6 becomes freely rotatable in the circumferential direction.

If the stationary portion of the motor 1 and the housing 5 are not securely fixed, this may cause backlash, play, and the like. In this case, accuracy in the rotating operation of the rotor of the motor 1 may decrease. To the contrary, in the torque restriction mechanism 200 according to the present embodiment, the first clutch 2 that is constantly driven is employed, so that the play in the motor 1 can be reduced. In addition, the second clutch 3 together with the first clutch 2 fixes the stationary portion of the motor 1 to the housing 5. In the second clutch 3, since a bending member or the like is used for the support at both sides thereof in the circumferential direction, the play can be suppressed. Note that, the bending member may be substituted with an elastic member such as a rubber seat.

In the present embodiment, the torque restriction value is changed in a stepwise manner. Instead of the stepwise change in the torque restriction value, ideal torque restriction values in accordance with the angular acceleration, shown by the dashed-dotted line C in FIG. 9, may be set by the controller 4. Further, in preparation for an emergency, such as runaway of the controller 4, a configuration in which both the torque restriction value is set stepwise and an ideal torque restriction value is set by the controller 4 may be employed. Note that the first clutch 2 according to the present embodiment 1 is not controlled by the controller 4. Thus, even if runaway of the controller 4 occurs, the first clutch 2 is not affected.

In order to achieve, in a controlled manner, the torque restriction value indicated by the dashed-dotted line C in the figure, requirements are that the torque of the rotor of the motor 1 is measured by a torque sensor, the measured torque value is monitored by the controller 4, and then the controller calculates the torque restriction value on the basis of the measured torque. However, in such a configuration, the torque cannot be cut off in case of runaway of the controller.

In addition, the structure may be complicated to achieve the ideal torque restriction value in a mechanical manner, but not in a controlled manner. In contrast, in the embodiment according to the present invention, a configuration is shown in which the torque restriction value can be set into two stages in a mechanical manner. Thus, the torque restriction mechanism can be configured with a simple structure, and the torque can be safely cut off even if the controller runaways. Note that, in the present embodiment, although the torque restriction values is set into two stages, however, the torque restriction mechanism may be configured to have multiple second clutches to set three or more torque restriction values.

As shown above, with the configuration in which the torque restriction mechanism having two clutches is provided in the motor 1, a robot device having a joint structure that absorbs and releases the external force applied to the robot device in a collision can be realized. Collision force applied to the robot device and an object at the time of a collision can be calculated using impulse. The shorter the duration of the collision is, the larger the collision force is. The torque restriction mechanism according to the embodiment of the present invention removes movement restriction of the stationary portion in the motor 1 in the circumferential direction, and thereby the stationary portion of the motor 1 becomes freely rotatable in the circumferential direction. As a result, the duration of the collision is extended, and thus the collision force is decreased. Therefore, damages to the object is reduced, so that it is possible to decrease the possibility of failure of the robot device and the motor 1. In addition, it is possible to secure safety for the object at the time of a collision.

Further, when only the second clutch 3 is used, since bendability of the plate spring 34 is used for the fixing, the drive reaction torque causes a slight movement in the circumferential direction. However, in working together with the first clutch 2, the position of the motor 1 can be kept constant in the circumferential direction until the torque reaches its restriction value. Thus, the torque restriction value can be set without decrease in the operation accuracy of the link mechanism 300 fixed to the rotor of the motor 1.

In a case where a plurality of drive devices 100 and link mechanisms 300 are combined, the case is similar to the case where a single drive device 100 and a single link mechanism 300 are used. In the case where the robot device includes a plurality of link mechanisms 300, the angle, the angular velocity, and the angular acceleration of each of other motors affect the reaction torque applied to the stationary portion of the motor 1. Therefore, the reaction torque needs to be calculated by the controller 4. Note that, even in a case where the plurality of link mechanisms 300, etc. are used, the torque restriction mechanisms 200 can be used on the basis of the calculated reaction torque in the same manner as in a case where a single link mechanism 300 is used.

Figure 10:
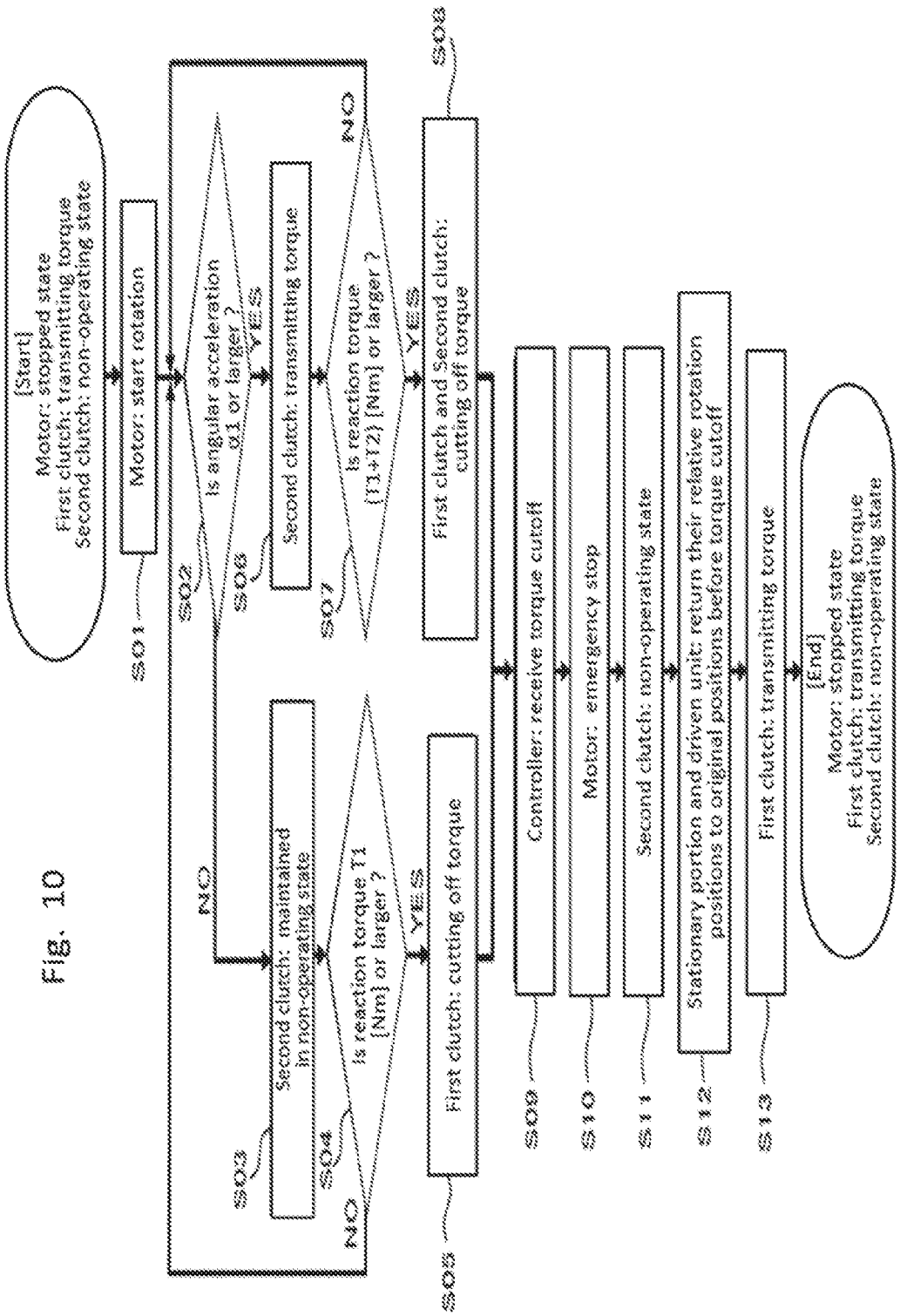
FIG. 10 is a flow chart to illustrate the torque restriction mechanism according to Embodiment 1

FIG. 10 is a flow chart showing an operation of the torque restriction mechanism 200 according to the embodiment. Using FIG. 10, the operation of the above-mentioned clutches (the first clutch 2 and the second clutch 3) will be described again.

First, in the initial state, the motor 1 is stopped, the first clutch 2 is transmitting torque, and the second clutch 3 is in a non-operating state. Here, as described before, the non-operating state refers to a state where the plate spring 34 is not locked in the concave block 32, in other words, it refers to a state where the clutch performs neither torque transmission nor torque cutoff in case of an overload.

In Step S01, the motor 1 starts rotating. In Step S02, it is determined whether the angular acceleration of the motor 1 equals or exceeds $\alpha 1$.

Note that, in accordance with the determination result in Step S02, the process branches off into Step S03 or Step S06. That is, in Step S02, if the angular acceleration of the motor 1 is equal to or larger than $\alpha 1$ (YES), the process proceeds to Step S06, and if it is smaller than $\alpha 1$ (NO), the process proceeds to Step S03.

The operational flow after the process branching off from Step S02 to Step S03 will be described. First, in Step S03, the second clutch 3 maintains the current non-operating state. Next, in Step S04, it is determined whether the reaction torque applied to the stationary portion of the motor 1 caused by a collision or the like is equal to or larger than the torque restriction value T1 [Nm]. In Step S04, if the reaction torque is equal to or larger than the torque restriction value T1 (YES), the process proceeds to Step S05. Otherwise, the process returns to Step S02 and the motor 1 continue to rotate. In Step S05, the first clutch 2 cuts off the torque, and as a result, the torque between the stationary portion of the motor 1 and the housing is cut off. Then, the driven unit can be manually rotated.

Next, an operational flow after the process branching off from Step S02 to Step S06 will be described. In Step S06, the second clutch 3 is in a state where the torque can be transmitted. In Step S07, it is determined whether the reaction torque applied to the stationary portion of the motor 1 caused by a collision or the like is equal to or larger than the torque restriction value T1+T2 [Nm]. If the reaction torque equals or exceeds the torque restriction value T1+T2 [Nm] (YES), the process proceeds to Step S08. Otherwise (NO), the process returns to Step S02. In Step S08, both the first clutch 2 and the second clutch 3 cut off the torque.

In Step S09, when the controller 4 receives a fact that clutch (the first clutch 2 or the second clutch 3) cuts off the torque, the controller 4 stops power supply to stop the motor 1. Next, in Step S10, when power supply from the controller 4 is stopped, the motor 1 emergently stops. In Step S11, the non-operating state is maintained or a shift to the non-operating state is carried out. To be more specific, when Step S11 is carried out through Step S03 to Step S05, the second clutch 3 maintains the non-operating state. Further, when Step S11 is carried out through Step S06 to Step S08, since the second clutch 3 already cuts off the torque (in Step S08) and is in the driven state, the second clutch 3 shifts its state to the non-operating state. At this moment, as mentioned above, the torque for the stationary portion and the driven unit is cut off, and thus, they can be rotated even manually. In Step S12, the relative rotational positions of the stationary portion and the driven unit are adjusted to return to the positions before the torque cutoff. After Step S12 is carried out, the process proceeds to Step S13, so that the first clutch 2 starts functioning mechanically and can transmit the torque.

After the operational flow as mentioned above is carried out, the state returns to their initial state before the execution of Step S01. At this moment, the motor 1 is in a stopped state, the first clutch 2 is in the torque transmission state, and the second clutch 3 is in the non-operating state. In the flow above, the process is terminated after Step S13. Instead, the process may return to Step S01 to carry out again the steps mentioned above.

Using the robot device with the configuration, even when the robot device collides with a person or an object, the movement restriction of the stationary portion in the motor 1 in the circumferential direction is removed, so that the force caused by the collision can be absorbed and released. Thus, by providing the torque restriction mechanism, it is possible to avoid damage to a person in a collision as well as failure of the robot device itself.

Note that, for example, when the robot device is stationary and a person puts his/her hand on the robot device, and thereby movement restriction of the stationary portion in the motor 1 in the circumferential direction is removed, the link mechanism 300 and the motor 1 are rotated by a large extent (for example, more than 90 degrees), and then the person may lose his/her balance and get injured. To prevent the situation described above, the upper limit of the rotation angle up to which the link mechanism 300 and the stationary portion of the motor 1 can freely rotate in the circumferential direction is set small (for example, ±30 degrees). Thus, in evacuation from the robot device, it is possible to reduce the risk that the rotation of the link mechanism 300 and motor 1 causes the person to fall down.

With such a configuration so far described, a torque restriction mechanism can be provided in which, by changing the number of clutches used on the basis of the rotational state of the rotor of the motor 1, a torque cutoff is reliably performed at the time of a collision without being affected by the rotation state of the rotor and thus damage to the collision object can be reduced even with a simple structure and control.

Embodiment 2

In Embodiment 1, the torque restriction value of the first clutch is set on the basis of the reaction torque which is the sum of the external force reaction torque generated by the external force and the drive reaction torque caused by the rotor of the motor 1. The present embodiment is different from Embodiment 1 in that the torque restriction value of the first clutch is set on the basis of only the reaction torque caused by the rotor of the motor 1. The same or the corresponding components as those described in the previous embodiment will be given the same numerals and their description will not be repeated.

Figure 11:
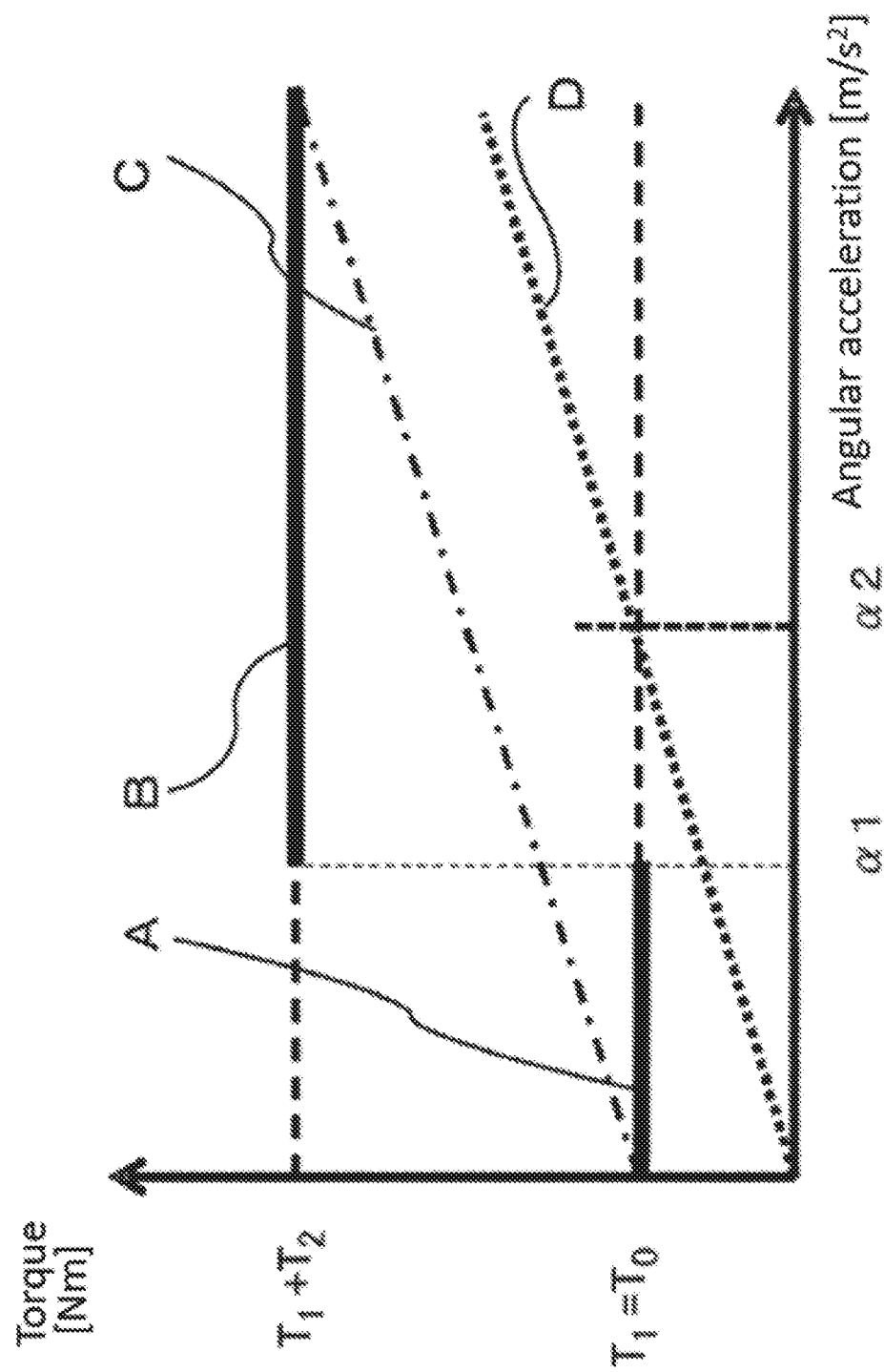
FIG. 11 is an illustrative diagram of the torque restriction values of a torque restriction mechanism according to Embodiment 2.

FIG. 11 is a graph showing torque restriction values of a torque restriction mechanism according to Embodiment 2.

If a torque restriction value is set below the dotted line D indicating drive reaction torque applied to the stationary portion of the motor 1, the torque restriction mechanism may cut off torque of the motor 1 due to the rotation of the motor 1 alone, and then, the rotor of the motor 1 emergently stops. This prevents the motor 1 from performing normal operation. In order to avoid such a problem, in FIG. 11, the torque restriction value T1 [Nm] of the first stage needs to be switched to the torque restriction value T1+T2 [Nm] of the second stage at the angular acceleration α1 being smaller than the angular acceleration α2. Here, the angular acceleration α2 is a value to be set so that the drive reaction torque generated when the rotor of the motor 1 rotates will be T0 [Nm] being a safety reference value.

In the present embodiment, the torque restriction value at which the first clutch cuts off the torque can be set to a smaller value than that in Embodiment 1. Thus, in addition to the effects obtained in Embodiment 1, the first clutch can be implemented with a simpler structure.

Embodiment 3

A torque restriction mechanism according to the present embodiment is different from that of Embodiment 1 in that a spring member, in addition to the configuration in Embodiment 1, is further included to restrict movement in the circumferential direction. The same or the corresponding components as those described in the previous embodiments will be given the same numerals and their description will not be repeated.

Figure 12:
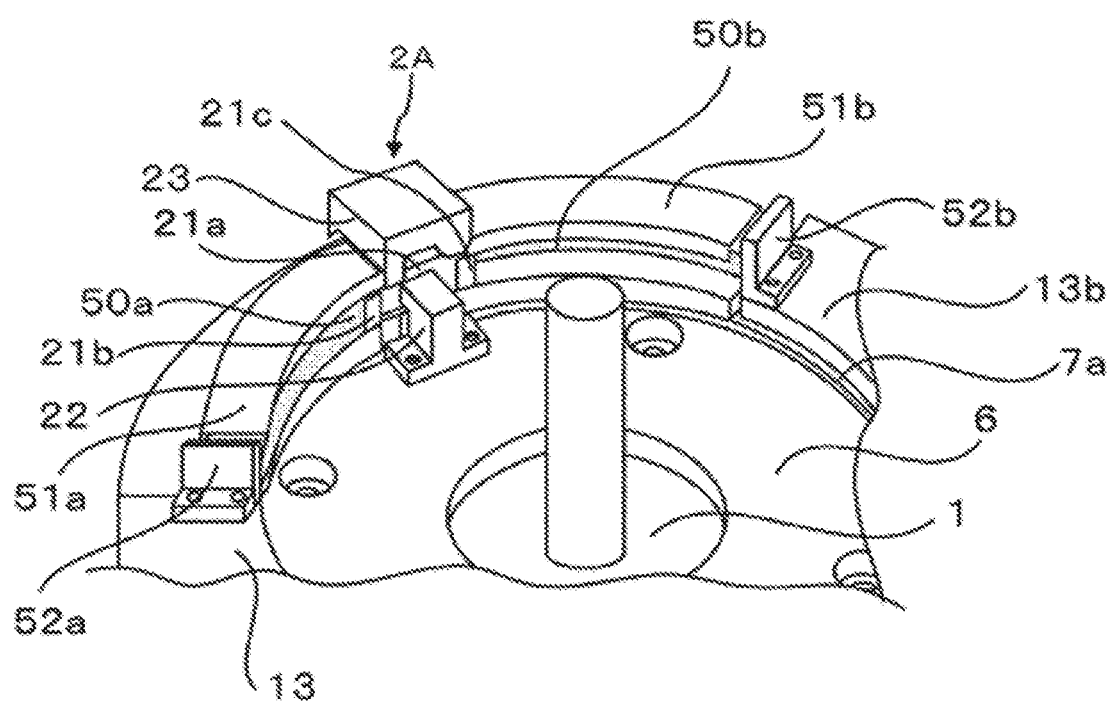
FIG. 12 is an enlarged view of main parts of a first clutch of a torque restriction mechanism according to Embodiment 3.

FIG. 12 is a perspective view of the torque restriction mechanism according to Embodiment 3, and is an enlarged view of a first clutch 2A. The configuration other than the first clutch 2A, such as the motor 1, the second clutch 3, and the controller 4, are the same as those in Embodiment 1. The torque restriction mechanism according to the present embodiment is different in that magnet restraint springs (resilient members) 50a and 50b, restraint spring housings 51a and 51b, as well as restraint spring fixers 52a and 52b are included, instead of the stopper 24 and the stopper support 25 in embodiment 1.

In the following description, the magnet restraint springs 50a and 50b, the restraint spring housings 51a and 51b, and the restraint spring fixers 52a and 52b may be referred to collectively as the magnet restraint spring 50, the restraint spring housing 51, and the restraint spring fixer 52, respectively.

A configuration of the first clutch 2A according to the embodiment of the present invention will be described below. As described previously, the permanent magnet 21a is fixed to the magnet support 22 and the magnet support 22 is fixed to the motor fixing plate 6. As the motor fixing plate 6 rotates in the circumferential direction, the permanent magnet 21a rotates around the rotation shaft of the rotor. However, the magnet restraint springs 50 are installed in the rotational direction of the permanent magnet 21a, the more the permanent magnet 21a rotates, the stronger resilient force the permanent magnet 21a receives from the magnet restraint springs 50, and thus, the impact force is reduced.

The magnet restraint spring 50 is entirely covered with the restraint spring housing 51. When the permanent magnet 21a is positioned within the magnet holder 23, the length of the magnet restraint spring 50a is shorter than its natural length, that is, the magnet restraint spring is in its compressed state.

Thus, with its resilient force, the magnet restraint spring 50a presses the permanent magnet 21b toward the magnet holder 23. Similarly, the magnet restraint spring 50b presses the permanent magnet 21c toward the magnet holder 23. The restraint spring housing 51 is fixed to the housing 5. With a groove provided inside the restraint spring housing 51, the permanent magnet 21a is not prevented from rotating. The permanent magnet 21b is pressed to the magnet holder 23 by the magnet restraint spring 50a.

Note that, whereas the value of T1 [Nm] in Embodiment 1 is determined by the attractive force of the permanent magnets, the value of T1 [Nm] in the present embodiment is determined in accordance with the resilient force of the magnet restraint spring 50a in addition to the attractive force of the permanent magnets. When force equal to or larger than the sum of the attractive force between the permanent magnets 21a and 21c, and the resilient force of the magnet restraint spring 50b in a compressed state is applied to the permanent magnet 21a, the first clutch 2A removes the rotational restriction of the stationary portion in the motor 1 in the circumferential direction. Thus, the torque restriction value corresponding to the sum of the elastic force and the attractive force is set to T1.

With the configuration, in addition to the operation described in Embodiment 1, in the case where the stationary portion of the motor 1 becomes freely rotatable in the circumferential direction, as its circumferential displacement becomes larger, the magnet restraint spring 50 gives the permanent magnet 21a larger resilient force in order to push back the permanent magnet 21a to the position of the magnet holder 23.

As described above, the torque restriction mechanism according to the present embodiment includes the magnet restraint spring 50 for the first clutch 2A. With the configuration, the permanent magnet 21a can be automatically returned to the position of the magnet holder 23 by the resilient force of the spring. Thus, the effect is such that, when the stationary portion of the motor 1 is brought back to the original position after an emergency stop of the motor, there is no need for any manual operation or any installation of a restoration device, etc.

Embodiment 4

In Embodiment 1, the first clutch 2 includes the permanent magnets 21a, 21b, and 21c, and restricts movement in the circumferential direction using the attractive force between these permanent magnets. In contrast, a first clutch 2B according to the present embodiment is different from that in embodiment 1 in that the first clutch 2B restricts movement in the circumferential direction using resilient force of rectangular block restraint springs. The same or the corresponding components as those described in the previous embodiments will be given the same numerals and their description will not be repeated.

Figure 13:
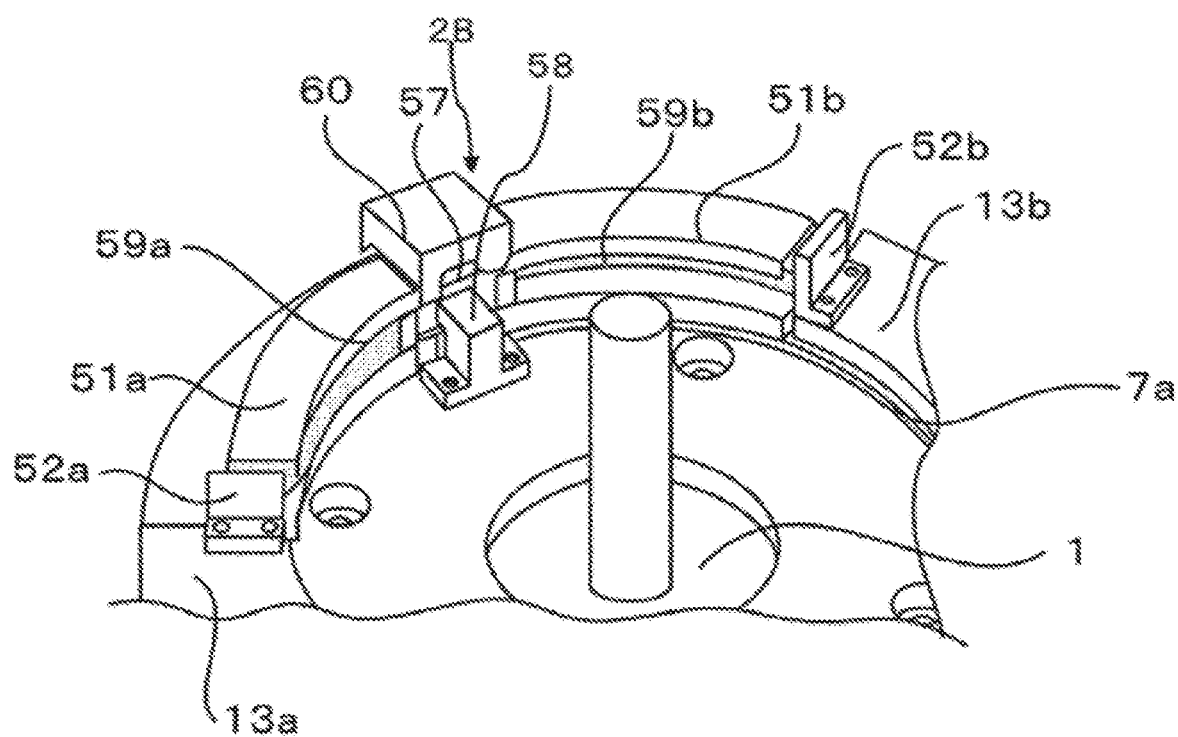
FIG. 13 is an enlarged view of main parts of a first clutch of a torque restriction mechanism according to Embodiment 4.

FIG. 13 is a perspective view of a torque restriction mechanism according to Embodiment 4, and is an enlarged view of the first clutch 2B. The components other than the first clutch 2B, such as the motor 1, the second clutch 3, and the controller 4, are the same as those in Embodiment 1. In the present embodiment, instead of the permanent magnets 21a, 21b, and 21c, the torque restriction mechanism includes a rectangular block 57 and rectangular block restraint springs 59a and 59b (resilient members with initial reaction force). It also includes a rectangular block support 58 instead of the magnet support 22. It further includes a rectangular block holder 60 instead of the magnet holder 23. The rectangular block restraint springs 59 are housed in cylindrical members in such a manner that their length is shorter than the natural length thereof, and thereby configured to have initial reaction force F [N (Newton)]. In other words, when force equal to or larger than F [N] is applied to the first clutch 2B, the rectangular block 57 can move in the circumferential direction.

A configuration of the first clutch 2B according to the embodiment of the present invention will be described below. The rectangular block 57 is fixed to the rectangular block support 58 and the rectangular block support 58 is fixed to the motor fixing plate 6. Thus, when the motor fixing plate 6 rotates in the circumferential direction, the rectangular block 57 rotates around the same shaft. The rectangular block 57 at its one side and the other side in the circumferential direction, however, has the rectangular block restraint spring 59a and the rectangular block restraint spring 59b disposed, respectively. With the configuration, movement of the stationary portion of the motor 1 in the circumferential direction is restricted.

Since the rectangular block holder 60 is fixed to the housing 5, the rectangular block restraint springs 59a and 59b cannot move to approach the rectangular block holder 60 in the circumferentially direction. Due to the rectangular block holder 60 fixed to the housing 5, the rectangular block restraint spring 59a cannot move in the clockwise direction and the rectangular block restraint spring 59b cannot move in the counter clockwise direction, further from the position of the rectangular block holder 60. The rectangular block restraint springs 59 are entirely covered by the restraint spring housings 51.

The restraint spring housings 51 are fixed to the housing 5. A groove is provided inside each of the restraint spring housings 51 so as not to prevent the rectangular block 57 from rotating.

Regarding the initial reaction force F [NT] and the torque restriction value T1 [Nm] of the first clutch 2B, the distance L from the drive rotation shaft of the motor 1 to the rectangular block 571 is determined so as to be equal to T1/F[m]. Thus, the torque restriction value of the first clutch 2B can be set to T1.

When the force applied to the rectangular block 57 equals or exceeds the force corresponding to the torque restriction value T1 [Nm], the force applied to move the rectangular block 57 in the counter clockwise direction exceeds the initial reaction force of the rectangular block restraint springs 59. Thus, the rectangular block 57 rotates, for example, in the counter clockwise direction. At this moment, the motor 1 and the motor fixing plate 6 become freely rotatable in the circumferential direction. The torque cutoff detection sensor 26 functions and causes the controller 4 to output an instruction for the stop of the motor 1.

In addition to the configuration in Embodiment 1, the present configuration includes the restraint springs 50 which, when the stationary portion of the motor 1 becomes freely rotatable in the circumferential direction, applies larger resilient force to the stationary portion of the motor 1 as the circumferential displacement becomes larger. Thus, the rectangular block 57 returns to its original position, where the rectangular block 57 is accommodated inside the rectangular block holder 60. In Step S12 of FIG. 10, after the torque cutoff, the clutches (the first clutch 2 and the second clutch 3) are manually reset to the state (initial position) before the torque cutoff. In the present embodiment, the reset to their initial positions is done by the rectangular block restraint spring, and thus, Step S12 can be omitted.

As described above, in addition to the effects obtained in Embodiment 1, using the rectangular block restraint springs in the first clutch 2B, after the stationary portion of the motor 1 becomes freely rotatable in the circumferential direction, the reset to their original positions by the resilient force of the springs can be done. Thus, there is no need to manually move the moved components to their original positions. In addition to the effects obtained in Embodiment 1, another effect is such that the robot device can be quickly restarted after the torque cutoff.

Embodiment 5

In Embodiment 1, the second clutch 3 includes the plate spring 34 being the clutch driven part and the concave block 32 serving as the clutch locking part. The present embodiment is different from Embodiment 1 in that the second clutch includes an outer ring being a clutch driven part and a ring receptor being a clutch locking part.

Figure 14:
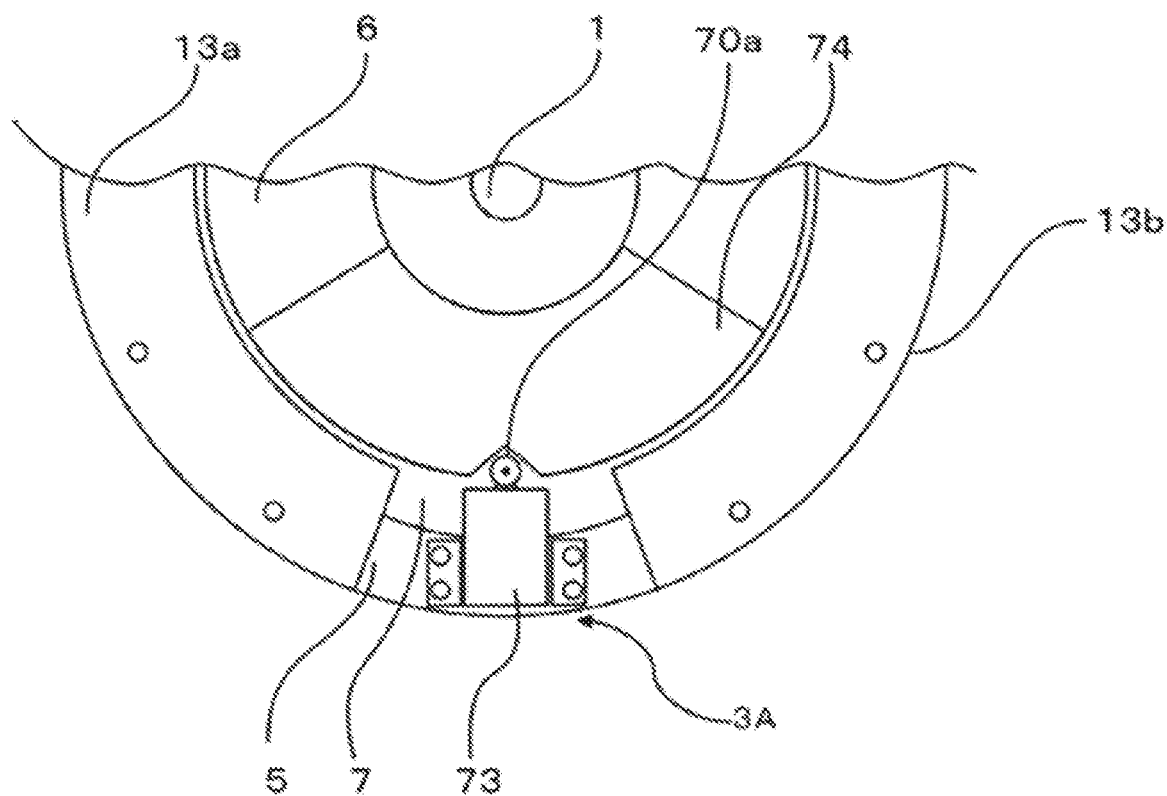
FIG. 14 is a top view of a second clutch of a torque restriction mechanism according to Embodiment 5.
Figure 15:
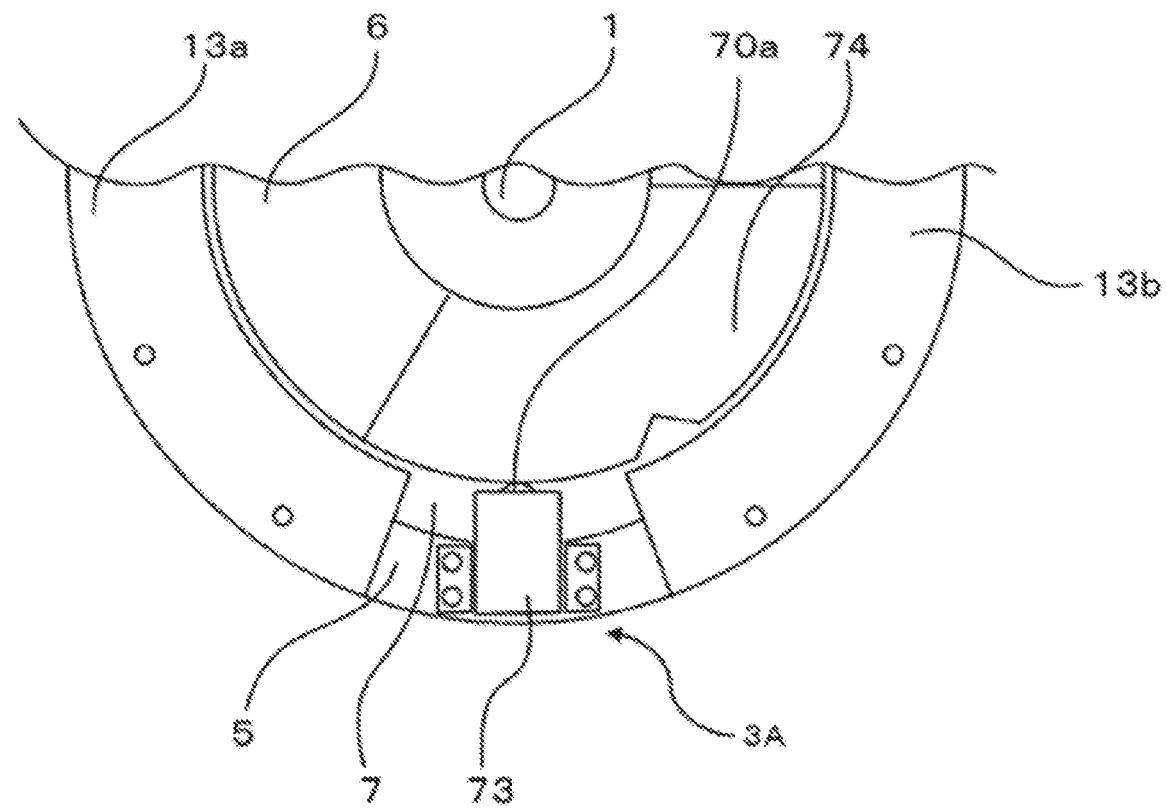
FIG. 15 is a top view of the second clutch showing a state in which movement restriction in the circumferential direction is removed in the torque restriction mechanism according to Embodiment 5.
Figure 16:
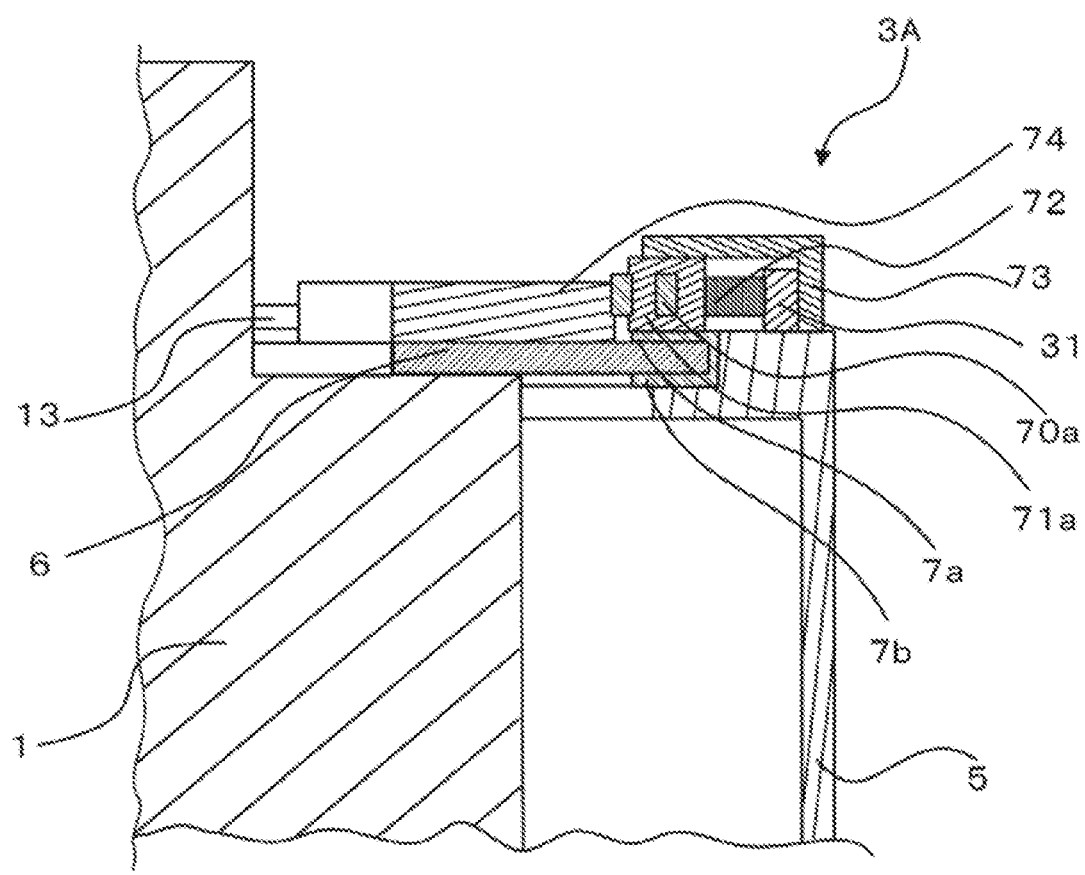
FIG. 16 is a cross-sectional view of the second clutch of the torque restriction mechanism according to Embodiment 5.

FIG. 14 is a top view of a second clutch 3A of a torque restriction mechanism according to Embodiment 5. FIG. 15 is a top view of the torque restriction mechanism according to Embodiment 5, and is an enlarged view of the second clutch 3A. FIG. 15 is a top view showing the second clutch 3A in which movement restriction in the circumferential direction is removed in the torque restriction mechanism according to Embodiment 5 of the present invention. FIG. 16 is an illustration showing the torque restriction mechanism according to Embodiment 5, and is a cross-sectional view of the second clutch 3A. The same or the corresponding components as those described in the previous embodiments will be given the same numerals and their description will not be repeated.

The second clutch 3A according to the present embodiment includes an outer ring 70a, a ring support 71a, a ring spring 72, a ring fixer 73, and a ring receptor 74. The ring fixer 73 is fixed to the housing 5. The ring fixer 73 includes therein the outer ring 70a which is cylindrical and freely rotatable. The ring receptor 74 is fixed to the motor fixing plate 6.

Here, as shown in the cross-sectional view in FIG. 16, the ring support 71a is disposed so that its axis can be in parallel with the axis of the drive rotation shaft of the motor 1. The outer ring 70a is supported by the ring support 71a so that the outer ring 70a can be freely rotatable around the axis of the ring support 71a. Using resilient force of the ring spring 72, the ring support 71a radially presses the outer ring 70a to the ring receptor 74 from the outside toward the drive rotation shaft. The ring support 71a is disposed in the ring fixer 73 so as to be movable radially inward and outward.

When the solenoid 31 is energized and driven in the direction to compress the ring spring 72, the resilient force of the ring spring 72 becomes larger. The outer ring 70a is pressed to the ring receptor 74 by the resilient force. Then, when force corresponding to the torque T2 [Nm] is applied to the second clutch 3A, the outer ring 70a fitted in a notch of the ring receptor 74 comes off from the notch outward in the radial direction as shown in FIG. 15. Thus, the motor fixing plate 6 becomes freely rotatable in the circumferential direction. In the present embodiment, when the second clutch 3A is driven, the first clutch 2 is also driven. Therefore, when a reaction torque of T1+T2 [Nm] is applied to the stationary portion of the motor 1 and the motor fixing plate 6 fixing the stationary portion, both of these two clutches (the first clutch 2 and the second clutch 3A) cut off the torque to make the stationary portion of the motor 1 freely rotatable in the rotational direction.

In the configuration according to the present embodiment described above, the ring is used instead of the plate spring used in Embodiment 1, and degradation over time is less when compared with the plate spring. Thus, in addition to the effects obtained in Embodiment 1, another effect is such that the second clutch having longer life time can be achieved.

Embodiment 6

In Embodiment 5, the second clutch 3A includes the outer ring 70a (clutch driven part) and the ring spring 72. When the solenoid 31 (clutch driver) is supplied with current, the second clutch 3A is driven as a clutch. The second clutch having a torque restriction mechanism according to the present embodiment is different in that a linear actuator (clutch driver) not shown is used instead of the solenoid 31. The displacement of the linear actuator is controlled and changed by a controller 4 in accordance with conditions such as a rotation state of the rotor of the motor 1, overall posture of the robot device, and a motion state of the robot device. The same or the corresponding components as those described in the previous embodiments will be given the same numerals and their description will not be repeated.

With the configuration mentioned above, the linear actuator continuously changes the length of the ring spring 72, so that the resilient force of the ring spring 72 applied to the outer ring 70a also changes. Thus, the torque restriction value T2 [Nm] of the second clutch 3 can be changed.

Using the linear actuator, the amount of calculation in the controller 4 is increased, compared with the case when the solenoid is used. The torque restriction values, however, can be made ideal values such as indicated by the dashed-dotted line C shown in FIG. 9.

Embodiment 7

Figure 17:
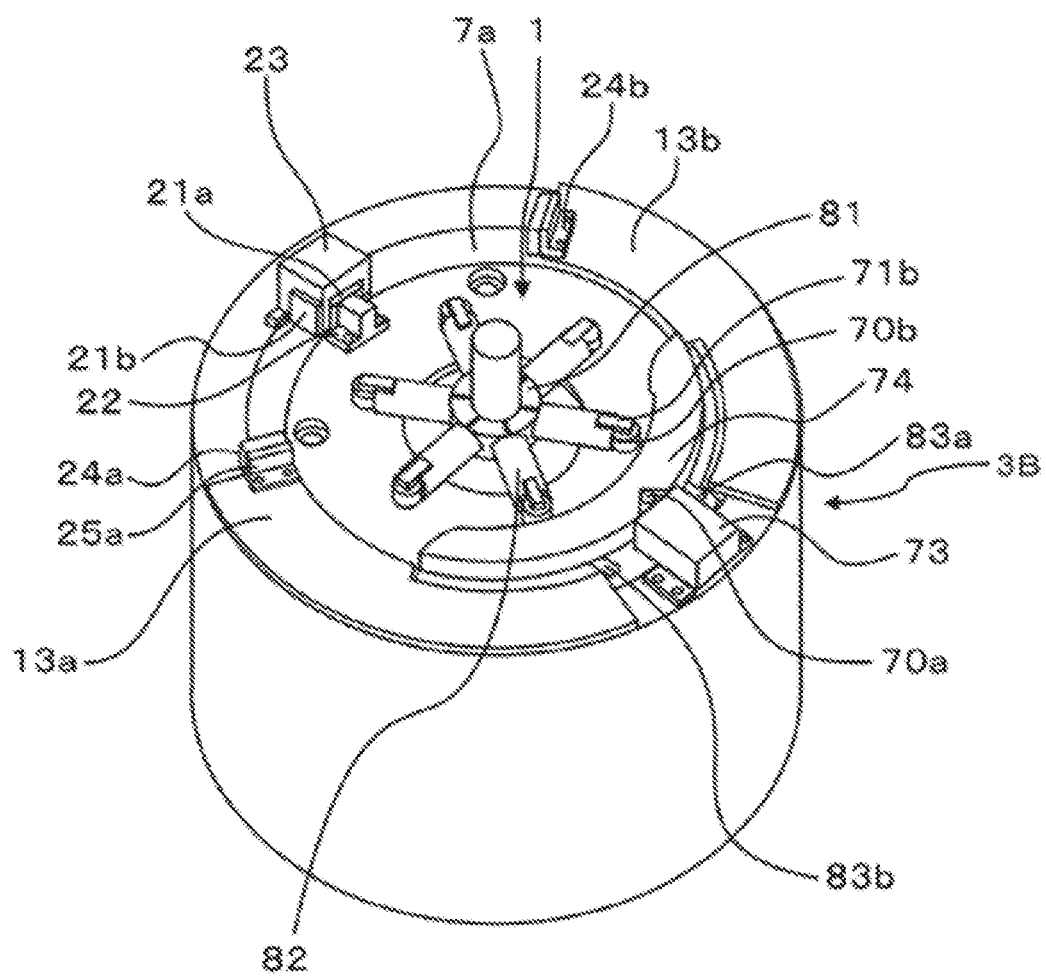
FIG. 17 is a perspective view to illustrate a torque restriction mechanism according to Embodiment 7.

FIG. 17 is a perspective view of a torque restriction mechanism according to Embodiment 7. The first clutch 2 and the controller 4 are the same as those of the configuration in Embodiment 1. The ring receptor 74 in Embodiment 5 is fixed on the motor fixing plate 6. In contrast, the torque restriction mechanism according to the present embodiment is different in that the ring receptor 74 is supported on the motor fixing plate 6 so as to be movable in the radial direction. In addition to the configuration of the second clutch 3A according to Embodiment 5, a second clutch 3B of the torque restriction mechanism according to the present embodiment includes a high-speed rotating part to rotate along with the rotor of the motor 1. The high-speed rotating part includes inner rings 70b, ring supports 71b, a coupling 81, and spring holders 82. The same or the corresponding components as those described in the previous embodiments will be given the same numerals and their description will not be repeated.

A configuration of the second clutch 3B according to the current embodiment of the present invention will be described below. The portions fixed to the housing 5 are the same as those in the configuration in Embodiment 5. That is, the outer ring 70a is pushed against the ring receptor 74 by the ring spring 72 shown in FIG. 16. The coupling 81 is fixed to the rotor of the motor 1.

Six spring holders 82 are fixed to the coupling 81 and rotate at the same rotation speed as that of the rotor of the motor 1. In each of the spring holders 82, a spring for the high-speed rotating part (not illustrated) is provided. A first end of the spring for the high-speed rotating part is connected to the coupling 81 and a second end thereof is connected to the ring support 71b.

Similar to the ring support 71a shown in FIG. 16, the ring supports 71b are disposed so that the axis thereof can be in parallel with the axis of the drive rotation shaft of the motor 1. The inner rings 70b are supported by the ring supports 71b so as to be freely rotatable around the axis of the respective ring supports 71b. Note that, the ring supports 71b are supported by the respective spring holders 82. Further, in the spring holders 82, the respective ring supports 71b are disposed so as to be movable in the radial direction. As the angular velocity of the rotor of the motor 1 increases, the springs for the high-speed rotating part expand owing to centrifugal force and the ring supports 71b move outward in the radial direction. As the ring supports 71b move, the inner rings 70b also move outward in the radial direction to make contact with the inner side of the ring receptor 74. The ring receptor 74 is disposed so as to be movable in the radial direction of the motor 1 through rails 83.

As the angular velocity of the rotor of the motor 1 further increases, the ring receptor 74 is pushed outward in the radial direction by the rotating inner rings 70b and moves outward in the radial direction through the rails 83. As the ring receptor 74 moves, the resilient force of the ring spring 72 shown in FIG. 16 changes, so that the torque restriction value of the second clutch 3B changes. The inner side of the ring receptor 74, that is, the side facing the inner rings 70b is formed to be in an arc shape having, for example, an angle of 120 degrees with respect to the drive rotation shaft of the rotor of the motor 1 as its center. In the present embodiment, since the six spring holders 82 are disposed equiangularly around the drive rotation shaft, the inner rings 70b of the high-speed rotating part 80 each are provided for every sixty degrees in each of the spring holders 82, and thereby two of the inner rings 70b in average are simultaneously in contact with the inner side of the ring receptor 74. Thus, the time interval during which the ring receptor 74 is in contact with the inner rings 70b can be made longer. Not to mention, the number of the spring holders 82 and the shape of the ring receptor 74 are not limited to those described above.

The inner rings 70b are connected to the drive rotation shaft of the motor 1 through the respective springs for the high-speed rotating part so as to be movable in the radial direction. When the rotor of the motor 1 rotates around the drive rotation shaft, the inner rings 70b move outward in the radial direction of the motor 1. The ring receptor 74 is disposed outward in the radial direction with respect to the inner rings 70b, and a notch is provided on one side therein that is opposite to the other side facing the inner rings 70b. The outer ring 70a is fixed to the housing 5 outward in the radial direction with respect to the ring receptor 74. When the angular velocity of the drive rotation shaft exceeds a predetermined value, the inner rings 70b move the ring receptor 74 outward in the radial direction, and thereby the notch of the ring receptor 74 is locked in the outer ring 70a.

When force applied to the second clutch 3B equals or exceeds the force corresponding to the torque restriction value T2, the outer ring 70a comes off from the notch of the ring receptor 74. Then, the second clutch 3B becomes freely rotatable in the circumferential direction. The torque restriction value T2 changes in accordance with the resilient force of the ring spring 72 and thereby increases as the angular velocity increases.

With the configuration described above, using centrifugal force, the resilient force in the second clutch 3B is changed, so that the torque restriction mechanism can be achieved in which the torque restriction value is changed in accordance with the motion state of the rotor of the motor 1 regardless of the condition of the controller 4. The torque restriction mechanism according to the present embodiment can be driven even when the controller 4 runaways.

The torque restriction mechanism according to the present embodiment is different from that of Embodiment 1 in that the torque restriction value is changed using the angular velocity instead of the angular acceleration. For example, when the motor is rotating at a constant angular velocity without acceleration or deceleration, then the angular acceleration is zero. In a robot device as an application example, however, the motor 1 does not continue rotating without acceleration or deceleration, and acceleration or deceleration is repeated while the link mechanism 300 moves within its movable range, so that the angular velocity also changes in accordance with the acceleration or the deceleration. Therefore, the second clutch 3B can be driven on the basis of the angular velocity as described in the torque restriction mechanism according to the present embodiment.

Moreover, in the torque restriction mechanism according to Embodiment 1, maximum torque is set as a threshold value with which a robot device can be stopped safely and reduce damage to a collision object in a collision. In the present embodiment, the second clutch 3B can be driven and stopped without depending on the controller. Thus, a torque restriction mechanism can be achieved in which damage to a collision object is reduced even in case of runaway of the controller.

Embodiment 8

In Embodiment 1, a plate spring is used for the second clutch 3. In a second clutch according to the embodiment of the present invention, a member such as a glass plate that can be broken by force is employed instead of the plate spring. When the second clutch is driven and reaction torque generated by external force caused by a collision exceeds T1+T2 [Nm], the glass plate is broken. Note that, to restart the motor 1, the glass plate needs to be replaced.

The glass plate is a member that is not bent due to stress but is broken by stress. Thus, the time needed from when the reaction torque exceeds the torque restriction value until the movement restriction in the circumferential direction is removed is shorter than that in the case where a plate spring is used. Further, because the glass plate has high rigidity, its displacement in the circumferential direction is smaller than that of the plate spring. Thus, in normal operation, accuracy in the circumferential movement of the rotor of the motor 1 can be further improved.

Work for the replacement of the glass is required, however, increase in the workload is not problematic. Because, when the controller 4 is monitoring the ideal torque restriction value as shown in FIG. 9, frequency at which the first clutch 2 and the second clutch that remove movement restriction in the circumferential direction is quite low. In the torque restriction mechanism according to the present embodiment, the glass plate is configured to be broken when the torque restriction value is exceeded, thereby bringing about the effect such that torque cutoff is reliably performed.

Embodiment 9

Figure 18:
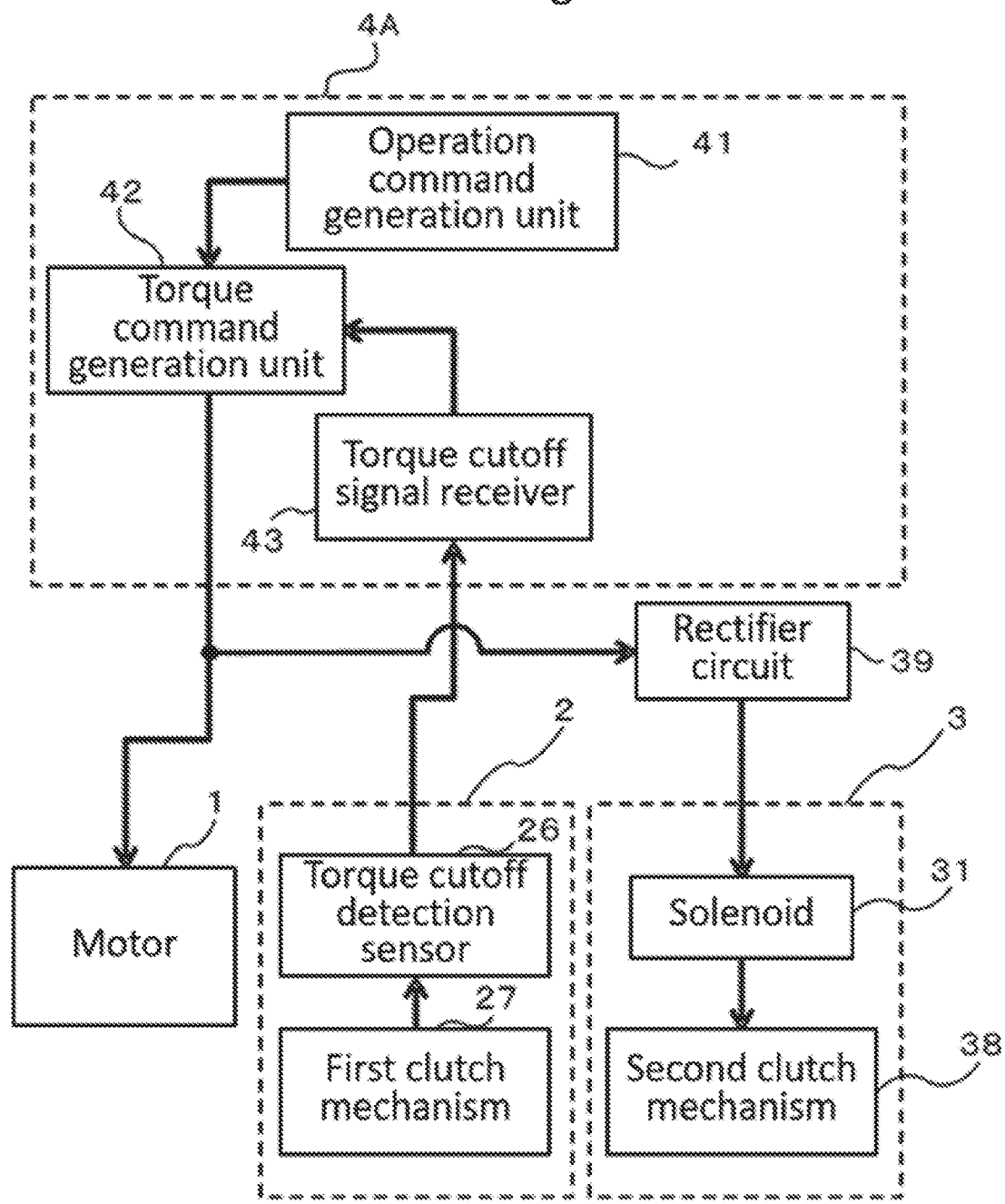
FIG. 18 is a block diagram showing a configuration of a torque restriction mechanism according to Embodiment 9.

FIG. 18 is a block diagram showing a configuration of a torque restriction mechanism according to Embodiment 9. In Embodiment 1, as shown in FIG. 7, the solenoid 31 starts or stops the operation on the basis of angular velocity information outputted by the operation command generation unit 41. In contrast, a torque restriction mechanism according to the present embodiment, as shown in FIG. 18, further includes a rectifier circuit 39 that receives part of the current outputted from the torque command generation unit 42. The same or the corresponding components as those described in the previous embodiments will be given the same numerals and their description will not be repeated.

In accordance with the change in angular velocity of the motor 1, the current value inputted to the rectifier circuit 39 changes, and in proportion to the magnitude of acceleration or deceleration of the motor 1, the current supplied from the rectifier circuit 39 to the solenoid 31 increases or decreases.

The relationship between the current value to be inputted to the rectifier circuit 39 and the current value to be supplied from the rectifier circuit 39 to the solenoid 31 is set correspondingly with the operation of the solenoid 31. In this way, the torque restriction mechanism can be configured so that, when the angular acceleration equals or exceeds a predetermined value, the solenoid 31 is brought into the operating state and the second clutch 3 is driven. Thus, the solenoid 31 is configured to be operated to lock the second end of the plate spring 34 in the concave block 32 when the current value outputted from the rectifier circuit 39 equals or exceeds a predetermined value.

Using FIG. 18, a controller 4A according to the embodiment of the present invention will be described. First, the controller 4A generates a command to control the motor 1 in the operation command generation unit 41. The torque command generation unit 42 generates a current signal such as a current waveform corresponding to the command, and then, the current is supplied to make the motor 1 perform designated operation. The rectifier circuit 39 converts this current to a waveform receivable for the solenoid 31. Further, when the stationary portion of the motor 1 becomes freely rotatable in the circumferential direction, the first clutch 2 transmits the torque cutoff signal, from the torque cutoff detection sensor 26 to the torque cutoff signal receiver 43 of the controller 4A. In the controller 4 shown in FIG. 18, the arrow from the first clutch mechanism 27 to the torque cutoff detection sensor 26 and the arrow from the solenoid 31 to the second clutch mechanism 38 indicate physical connections, while the other arrows indicate electric connections. The torque cutoff signal receiver 43 transmits a current signal to the torque command generation unit 42 to stop a torque command to the motor 1, and thereby the motor 1 emergently stops.

Figure 19:
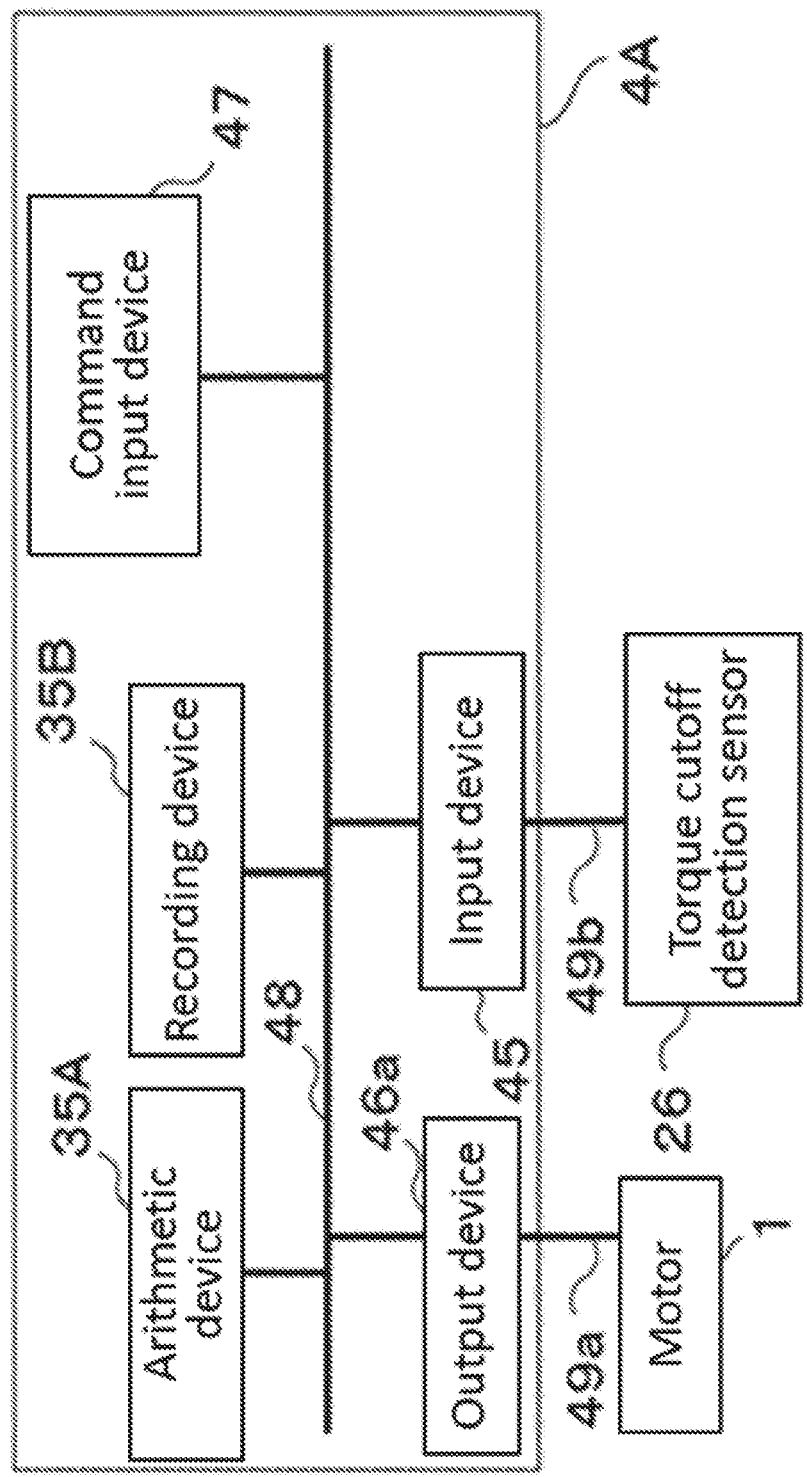
FIG. 19 is a hardware configuration diagram of the torque restriction mechanism according to Embodiment 9.

FIG. 19 is a hardware configuration diagram of the controller 4A shown in FIG. 18. Comparing with the hardware configuration in Embodiment 1 (shown in FIG. 8), the configuration according to the embodiment of the present invention is different in that the output device 46b connected to the second clutch 3 is not included. In the figure, the same or the corresponding hardware components as those shown in FIG. 8 will be given the same numerals and their description will not be repeated.

Using FIG. 18 and FIG. 19, operation and configuration of the controller 4A will be described. The processing performed by the operation command generation unit 41 and the torque command generation unit 42 (shown in FIG. 18) are implemented by the arithmetic device 35A. The current signal outputted from the torque command generation unit 42 is also inputted to the rectifier circuit 39. Using this inputted current signal, the rectifier circuit 39 supplies current to the second clutch 3. In accordance with the current outputted from the rectifier circuit 39, the operating state of the second clutch 3 is switched (operating state or non-operating state). A command to the motor 1, generated by the arithmetic device 35A, is outputted via the output device 46a. When, due to a collision or the like, the torque cutoff detection sensor 26 detects a torque cutoff of the first clutch 2, the input device 45 constituting the torque cutoff signal receiver 43 transmits a signal to the arithmetic device 35A constituting the torque command generation unit 42. Upon receiving the signal, the torque command generation unit 42 stops supplying the current signal. When the torque command generation unit 42 stops supplying the current signal, the motor 1 emergently stops. Along with the emergency stop of the motor 1, the current signal to the rectifier circuit 39 is stopped, and thus the second clutch 3 is brought into a non-operating state.

As described above, the torque restriction mechanism according to the present embodiment includes the rectifier circuit 39 for receiving current that corresponds to the control signal and is sent to the motor. Because of the above, a current value corresponding to a rotation state of the rotor of the motor 1 is supplied from the rectifier circuit 39 to the second clutch 3. Thus, the second clutch 3 can be properly driven or stopped in accordance with the rotation state of the motor 1. Therefore, in addition to the effects achieved in Embodiment 1, even when the controller runaways, the second clutch 3 can be properly driven or stopped, that is, another effect is such that the torque restriction mechanism is not being affected by the runaway of the controller.

Although the embodiments of the present invention are described above, it is needless to say that the torque limiting mechanism may be configured by suitably combining Embodiments 1 through 9.

The invention claimed is:

1. A torque restriction mechanism to be connected to a housing and a stationary portion that includes a stator of a motor for rotating a driven unit with respect to the housing of a drive device for housing the motor, and to transmit or cut off torque from the housing to the stationary portion, the torque restriction mechanism comprising:
   a first clutch to cut off the torque to the driven unit when reaction torque generated in the stationary portion due to rotation of the driven unit equals or exceeds a predetermined first value; and
   a second clutch to transmit the torque based on a rotation state of a rotor of the motor to be connected to the driven unit,
   wherein the second clutch cuts off the torque to the driven unit when the reaction torque equals or exceeds a second value larger than the first value.

2. The torque restriction mechanism according to claim 1, wherein the second clutch is driven when angular acceleration of the rotor equals or exceeds a predetermined value and is not driven when the angular acceleration of the rotor is smaller than the predetermined value.

3. The torque restriction mechanism according to claim 2, wherein the second clutch comprises:
   a clutch driven part fixed to the housing at a first end thereof;
   a clutch driver to move a second end of the clutch driven part at an inner side in a radial direction of the motor; and
   a clutch locking part fixed to the stationary portion,
   and wherein, the clutch driver locks the second end of the clutch driven part in the clutch locking part when the angular acceleration equals or exceeds the predetermined value.

4. The torque restriction mechanism according to claim 3, wherein the clutch driven part is made of material to be broken when stress being equal to or exceeding a predetermined value is applied.

5. The torque restriction mechanism according to claim 3, further comprising a rectifier circuit to output current value corresponding to the angular acceleration of the rotor, wherein the clutch driver locks the second end of the clutch driven part in the clutch locking part when the current value outputted from the rectifier circuit equals or exceeds a predetermined value.

6. The torque restriction mechanism according to claim 1, wherein, the housing supports the stationary portion so as to be freely rotatable in a circumferential direction thereof,
the second clutch comprises:
one or more inner rings each connected to a drive rotation shaft of the rotor and to move radially outward in the motor owing to rotation of the drive rotation shaft;
a ring receptor disposed in the stationary portion radially outward with respect to the one or more inner rings, having a notch on one side that is opposite to the other side facing the one or more inner rings; and
an outer ring provided radially outward with respect to the ring receptor in a place facing the notch, and fixed to the housing,
wherein, when an angular velocity of the drive rotation shaft exceeds a predetermined value, the one or more inner rings move the ring receptor radially outward to lock the notch of the ring receptor in the outer ring.

7. The torque restriction mechanism according to claim 1, wherein the first clutch includes a spring for return to a position before the torque is cut off in a case where the torque to the driven unit is cut off.

8. The torque restriction mechanism according to claim 1, wherein the first clutch further includes a resilient member having initial reaction force to restrict circumferential movement of the motor.

9. A drive device comprising the motor and the torque restriction mechanism according to claim 1.

10. A robot device comprising the drive device according to claim 9 and the driven unit rotated by the motor.

11. A drive device comprising:
an electric motor that includes a stator and a rotating rotor;
a housing that houses the electric motor and that transfers torque generated by the electric motor;
a magnetic clutch that magnetically attaches the electric motor to the housing, the magnetic clutch disengages the electric motor from the housing in response to receiving a reaction torque greater than the magnetic force holding the electric motor to the housing;
a locking clutch that attaches the electric motor to the housing, the locking clutch includes an actuator that engages the locking clutch with the electric motor to enable and disable torque control by the locking clutch, the locking clutch disengages the electric motor from the housing in response to receiving a reaction torque that exceeds a locking force holding the actuator of the locking clutch to the electric motor;
a controller configured to control the electric motor, compute an angular acceleration of the electric motor based on the control of the electric motor, and operate the actuator of the locking clutch to enable the locking clutch in response to determining that the angular acceleration of the electric motor is equal to, or greater than, a predetermined threshold, wherein
the magnetic clutch and the locking clutch are configured to disengage the electric motor from the housing without receiving a command from the controller to disengage the housing.

12. The drive device according to claim 11, wherein the controller is configured to disable the locking clutch in response to determining that the angular acceleration of the electric motor is below the predetermined threshold.

13. The drive device according to claim 11, further comprising:
a torque cutoff detection sensor that outputs a torque cutoff signal in response to the magnetic clutch disengaging the housing from the electric motor fixing plate, wherein
the controller is configured to stop supplying current to the electric motor in response to receiving the torque cutoff signal from the torque cutoff detection sensor.

14. The drive device according to claim 11, wherein the housing further comprises
a support flange that extends toward the electric motor,
an electric motor fixing plate that is located above the support flange and that attaches the electric motor to the magnetic clutch and the locking clutch, and
a sliding plate that is located between the support flange and the electric motor fixing plate and that allows the electric motor to rotate freely without transferring torque to the housing when the electric motor is disconnected from the magnetic clutch and the locking clutch.

15. The drive device according to claim 14, wherein the magnetic clutch further comprises
a magnet support that is attached to the electric motor fixing plate and that includes a support surface,
a fixed permanent magnet that includes a first end and a second end opposite to the first end in a circumferential direction of the electric motor, the fixed permanent magnet includes an outer surface and an inner surface opposite to the outer surface in a radial direction of the electric motor, the inner surface of the fixed permanent magnet is attached to the support surface of the magnetic support,
a first detachable permanent magnet magnetically attached to the first end of the fixed permanent magnet, the first detachable magnet includes a surface that extends beyond the outer surface of the fixed permanent magnet in the radial direction of the electric motor,
a second detachable permanent magnet magnetically attached to the second end of the fixed permanent magnet, the second detachable permanent magnet includes a surface that extends beyond the outer surface of the fixed permanent magnet in the radial direction of the electric motor, and
a magnet holder that restricts circumferential movement of the first detachable permanent magnet, the second detachable permanent magnet, and the fixed permanent magnet, the magnet holder includes a first convex protrusion that extends towards the fixed permanent magnet in the radial direction and catches the surface of the first detachable magnet that extends beyond the outer surface of the fixed permanent magnet in the radial direction of the electric motor, the magnet holder includes a second convex protrusion that extends towards the fixed permanent magnet in the radial direction and catches the surface of the second detachable magnet that extends beyond the outer surface of the fixed permanent magnet in the radial direction of the electric motor.

16. The drive device according to claim 14, wherein the locking clutch further comprises
a concave block fixed to the electric motor fixing plate, the concave block includes a locking groove,
a plate spring that includes a first end and a second end, the second end of the plate spring locks into the locking groove of the concave block to attach the electric motor to the housing,
a plate spring holder attached to the flange of the housing, the plate spring holder includes a plate spring pin that extends through the first end of the plate spring in the circumferential direction of the electric rotor, wherein the actuator presses the plate spring into the locking groove in response to a command from the controller to enable the locking clutch, and the second end of the plate spring disengages from the locking groove of the concave block in response to receiving a reaction torque greater than the locking force holding the second end of the plate spring.

17. The drive device according to claim 14, wherein the locking clutch further comprises a ring receptor that is fixed to the electric motor fixing plate and that includes a locking notch, an outer ring that presses into the locking notch of the ring receptor to lock the electric motor to the housing and allow torque to transfer from the electric motor to the housing, a spring that presses the outer ring into the locking notch based on a resilient force of the spring, wherein the actuator is a solenoid that actuates the spring to press the outer ring towards the notch of the ring receptor in the radial direction of the electric motor in response to receiving a command from the controller to enable the locking clutch, and the spring releases the outer ring from the locking notch to disengage the electric motor from the housing in response to an angular acceleration that overcomes the resilient force applied by the spring.

18. A drive device comprising:

an electric motor that includes a stator and a rotating rotor;

a housing that houses the electric motor and that includes an electric motor fixing plate attached to the electric motor and a sliding plate that supports the electric motor fixing plate, the housing transfers torque generated via the rotating rotor of the electric motor;

a magnetic clutch magnetically attached between the housing and the electric motor fixing plate to transfer torque from the electric motor to the housing, the magnetic clutch disengages the electric motor fixing plate from the housing in response to a reaction torque greater than a magnetic force holding the electric motor fixing plate to the housing to release the housing from the rotating rotor and allow the electric motor to freely rotate on the sliding plate without transferring torque to the housing;

a torque cutoff detection sensor that outputs a torque cutoff signal in response to the magnetic clutch disengaging the electric motor fixing plate from the housing;

a locking clutch attached to the housing that engages with the electric motor fixing plate to enable torque transfer from the electric motor to the housing, the locking clutch includes an actuator that enables and disables torque control by the locking clutch; and a controller electrically connected to the electric motor, the torque cutoff detection sensor, and the actuator of the locking clutch, the controller is configured to control the rotating rotor, determine an angular acceleration of the electric motor based on the control of the rotating rotor, operate the actuator of the locking clutch to enable torque control by the locking clutch in response to determining that the angular acceleration of the electric motor is equal to, or greater than, a predetermined threshold, and stop current supply to the rotating rotor in response to receiving the torque cutoff detection signal from the torque cutoff detection sensor.

19. The drive device according to claim 18, wherein the magnetic clutch disengages the electric motor fixing plate from the housing without receiving a control command from the controller.

\* \* \* \* \*